US012756513B2

(12) United States Patent
Ma et al.

(10) Patent No.: US 12,756,513 B2
(45) Date of Patent: Oct. 6, 2026

(54) DEMODULATION REFERENCE SIGNAL BUNDLING OF A MESSAGE OF A RANDOM ACCESS PROCEDURE

(71) Applicant: QUALCOMM Incorporated, San Diego, CA (US)

(72) Inventors: Liangping Ma, San Diego, CA (US); Xiao Feng Wang, San Diego, CA (US); Changhwan Park, San Diego, CA (US); Alberto Rico Alvarino, San Diego, CA (US); Bharat Shrestha, San Diego, CA (US); Mahmoud Taherzadeh Boroujeni, San Diego, CA (US); Gokul Sridharan, Sunnyvale, CA (US); Sanghoon Kim, San Jose, CA (US); Jae Ho Ryu, San Diego, CA (US); Peter Gaal, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 478 days.

(21) Appl. No.: 18/365,120

(22) Filed: Aug. 3, 2023

(65) Prior Publication Data

US 2024/0048312 A1 Feb. 8, 2024

Related U.S. Application Data

(60) Provisional application No. 63/370,733, filed on Aug. 8, 2022.

(51) Int. Cl.
*H04W 28/02* (2009.01)
*H04L 5/00* (2006.01)
*H04W 74/00* (2009.01)
*H04W 74/0833* (2024.01)

(52) U.S. Cl.
CPC ......... *H04L 5/0048* (2013.01); *H04W 74/004* (2013.01); *H04W 74/0833* (2013.01)

(58) Field of Classification Search
CPC ......... H04W 74/0833; H04W 73/0833; H04W 72/046; H04W 74/004; H04W 74/006; H04B 7/0626; H04L 5/0048; H04L 1/0007
See application file for complete search history.

(56) References Cited

U.S. PATENT DOCUMENTS

2022/0191937 A1 6/2022 Lei et al.
2022/0247601 A1 8/2022 Sridharan et al.
2025/0142624 A1* 5/2025 Alfarhan ............. H04W 72/046

OTHER PUBLICATIONS

International Search Report and Written Opinion—PCT/US2023/071717—ISA/EPO—Nov. 10, 2023.

(Continued)

*Primary Examiner* — Phuoc H Doan
(74) *Attorney, Agent, or Firm* — QUALCOMM Incorporated

(57) ABSTRACT

Various aspects of the present disclosure generally relate to wireless communication. In some aspects, a user equipment (UE) may communicate, before establishing a radio resource control (RRC) connection, support for demodulation reference signal (DMRS) bundling of a message of a random access (RA) procedure. The UE may transmit the message of the RA procedure based at least in part on the support for DMRS bundling. Numerous other aspects are described.

30 Claims, 12 Drawing Sheets

(56) References Cited

OTHER PUBLICATIONS

Qualcomm Incorporated: "Joint Channel Estimation for PUSCH", 3GPP TSG-RAN WG1 Meeting #104e, R1-2101479, 3rd Generation Partnership Project, Mobile Competence Centre, 650, Route Des Lucioles, F-06921 Sophia-Antipolis Cedex, France, vol. RAN WG1, No. e- Meeting, Jan. 25, 2021-Feb. 5, 2021, Jan. 19, 2021, 4 Pages, XP051971644.

* cited by examiner

DEMODULATION REFERENCE SIGNAL BUNDLING OF A MESSAGE OF A RANDOM ACCESS PROCEDURE

CROSS-REFERENCE TO RELATED APPLICATION

This Patent Application claims priority to U.S. Provisional Patent Application No. 63/370,733, filed on Aug. 8, 2022, entitled "DEMODULATION REFERENCE SIGNAL BUNDLING OF A MESSAGE OF A RANDOM ACCESS PROCEDURE," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for demodulation reference signal bundling of a message of a random access procedure.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include communicating, before establishing a radio resource control (RRC) connection, support for demodulation reference signal (DMRS) bundling of a message of a random access (RA) procedure. The method may include transmitting the message of the RA procedure based at least in part on the support for DMRS bundling.

Some aspects described herein relate to a method of wireless communication performed by a network node. The method may include communicating, before establishing an RRC connection, support for DMRS bundling of a message of an RA procedure. The method may include receiving, from a UE, the message of the RA procedure based at least in part on the support for DMRS bundling.

Some aspects described herein relate to a UE for wireless communication. The UE may include one or more memories and one or more processors coupled to the one or more memories. The one or more processors may be configured, individually or in any combination, to communicate, before establishing an RRC connection, support for DMRS bundling of a message of an RA procedure. The one or more processors may be configured, individually or in any combination, to transmit the message of the RA procedure based at least in part on the support for DMRS bundling.

Some aspects described herein relate to a network node for wireless communication. The network node may include one or more memories and one or more processors coupled to the one or more memories. The one or more processors may be configured, individually or in any combination, to communicate, before establishing an RRC connection, support for DMRS bundling of a message of an RA procedure. The one or more processors may be configured, individually or in any combination, to receive, from a UE, the message of the RA procedure based at least in part on the support for DMRS bundling.

Some aspects described herein relate to a non-transitory computer-readable medium that stores a set of instructions for wireless communication by a UE. The set of instructions, when executed by one or more processors of the UE, may cause the UE to communicate, before establishing an RRC connection, support for DMRS bundling of a message of an RA procedure. The set of instructions, when executed by one or more processors of the UE, may cause the UE to transmit the message of the RA procedure based at least in part on the support for DMRS bundling.

Some aspects described herein relate to a non-transitory computer-readable medium that stores a set of instructions for wireless communication by a network node. The set of instructions, when executed by one or more processors of the network node, may cause the network node to communicate, before establishing an RRC connection, support for DMRS bundling of a message of an RA procedure. The set of instructions, when executed by one or more processors of the network node, may cause the network node to receive, from a UE, the message of the RA procedure based at least in part on the support for DMRS bundling.

Some aspects described herein relate to an apparatus for wireless communication. The apparatus may include means for communicating, before establishing an RRC connection, support for DMRS bundling of a message of an RA procedure. The apparatus may include means for transmitting the message of the RA procedure based at least in part on the support for DMRS bundling.

Some aspects described herein relate to an apparatus for wireless communication. The apparatus may include means for communicating, before establishing an RRC connection, support for DMRS bundling of a message of an RA procedure. The apparatus may include means for receiving, from a UE, the message of the RA procedure based at least in part on the support for DMRS bundling.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
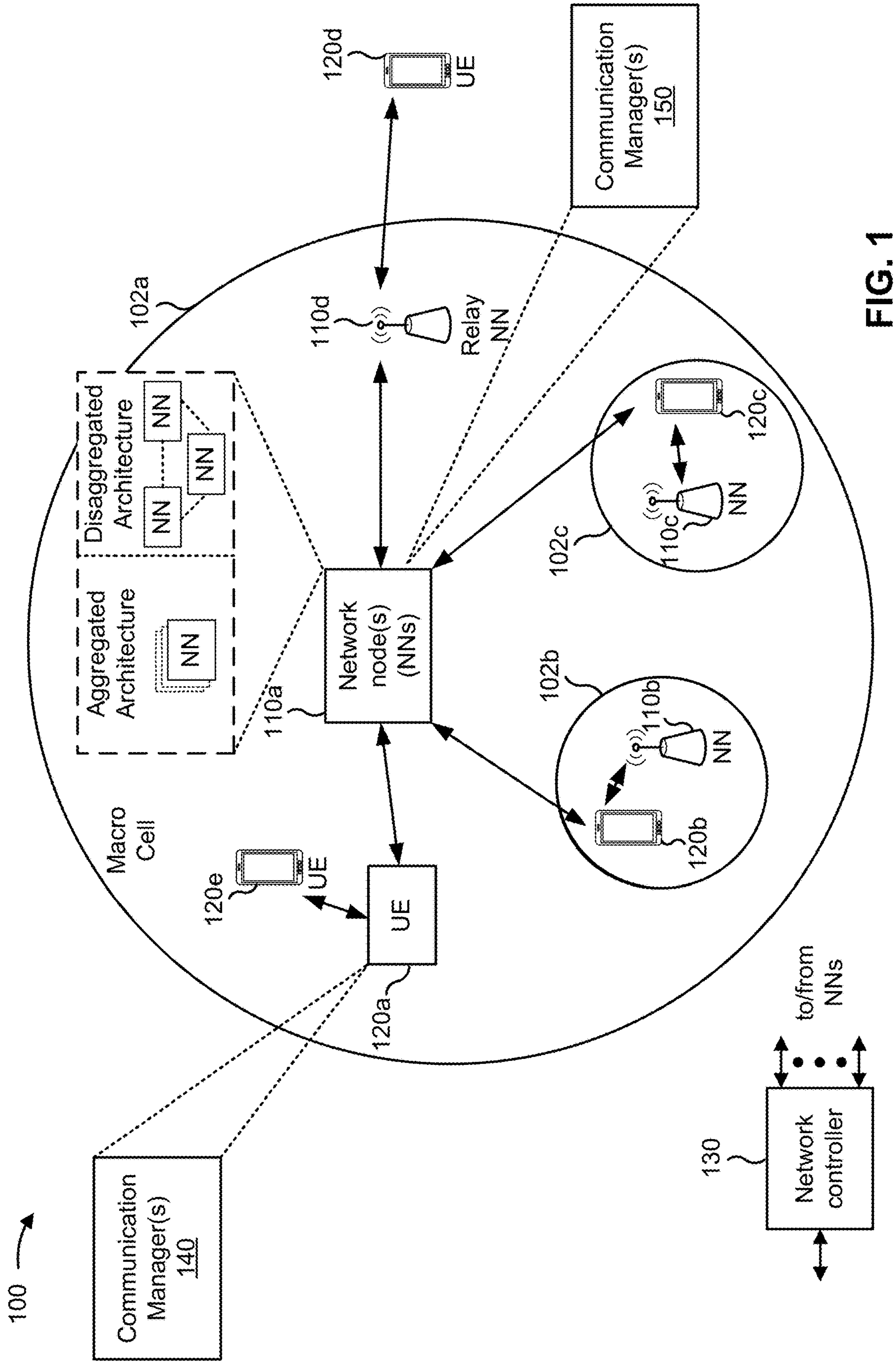
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a user equipment (UE) 120 or multiple UEs 120 (shown as a UE 120*a*, a UE 120*b*, a UE 120*c*, a UE 120*d*, and a UE 120*e*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., one or more memories) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may communicate, before establishing a radio resource control (RRC) connection, support for demodulation reference signal (DMRS) bundling of a message of a random access (RA) procedure; and transmit the message of the RA procedure based at least in part on the support for DMRS bundling. Additionally, or alternatively, the communication manager 140 may perform one or more other operations described herein.

In some aspects, the network node may include a communication manager 150. As described in more detail elsewhere herein, the communication manager 150 may communicate, before establishing an RRC connection, support for DMRS bundling of a message of an RA procedure; and receive, from a UE, the message of the RA procedure based at least in part on the support for DMRS bundling. Additionally, or alternatively, the communication manager 150 may perform one or more other operations described herein.

As indicated above, FIG. 1 is provided as an example. Other examples may differ from what is described with regard to FIG. 1.

Figure 2:
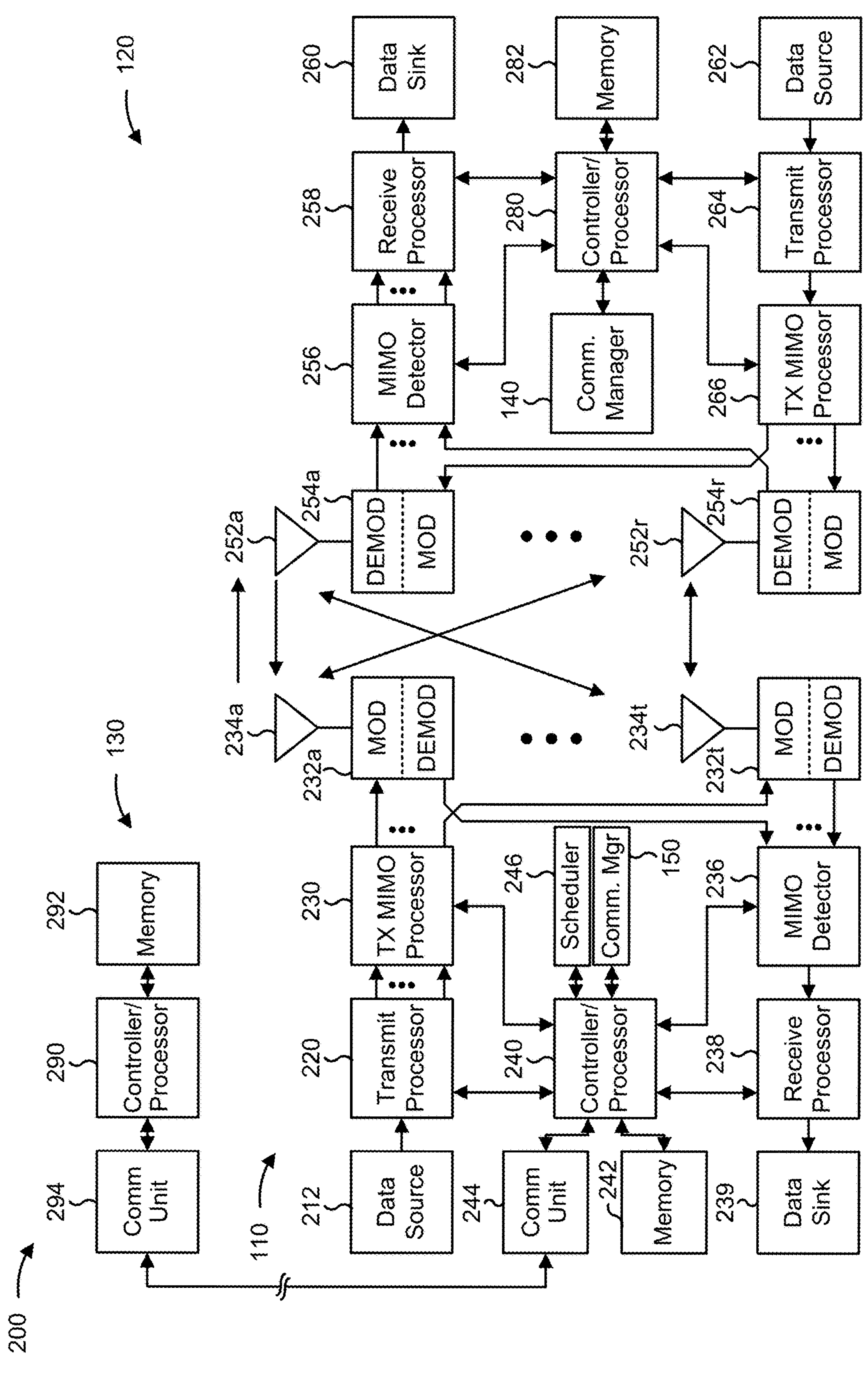
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a DMRS) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292 (e.g., one or more memories). The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-12).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-12).

The controller/processor 240 of the network node 110, the controller/processor 280 of the UE 120, and/or any other component(s) of FIG. 2 may perform one or more techniques associated with demodulation reference signal bundling of a message of a random access procedure, as described in more detail elsewhere herein. For example, the controller/processor 240 of the network node 110, the controller/processor 280 of the UE 120, and/or any other component(s) of FIG. 2 may perform or direct operations of, for example, process 900 of FIG. 9, process 1000 of FIG. 10, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, the UE includes means for communicating, before establishing an RRC connection, support for DMRS bundling of a message of an RA procedure; and/or means for transmitting the message of the RA procedure based at least in part on the support for DMRS bundling. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node includes means for communicating, before establishing an RRC connection, support for DMRS bundling of a message of an RA procedure; and/or means for receiving, from a UE, the message of the RA procedure based at least in part on the support for DMRS bundling. In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
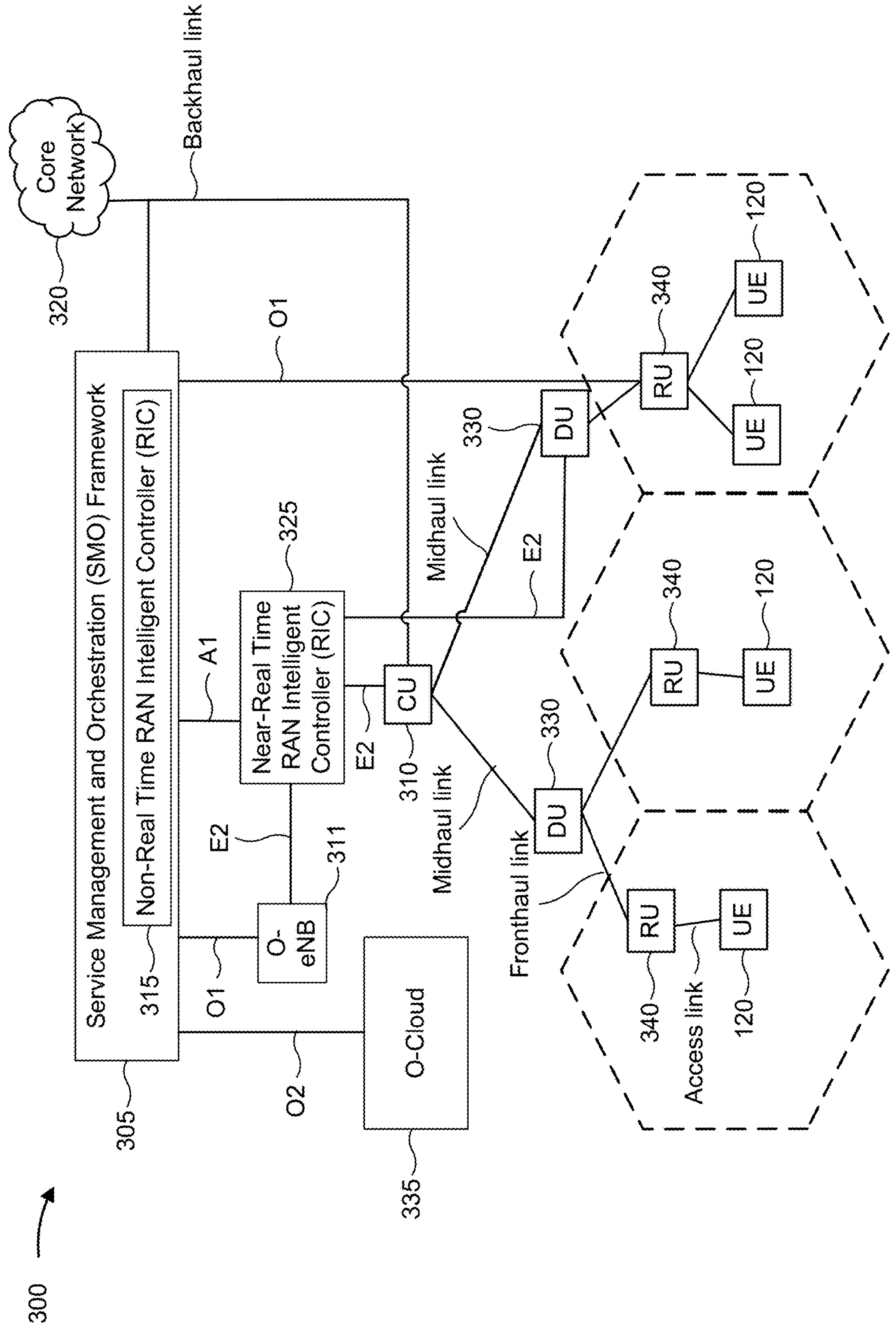
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include RRC functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit—User Plane (CU-UP) functionality), control plane functionality (for example, Central Unit—Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 335) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
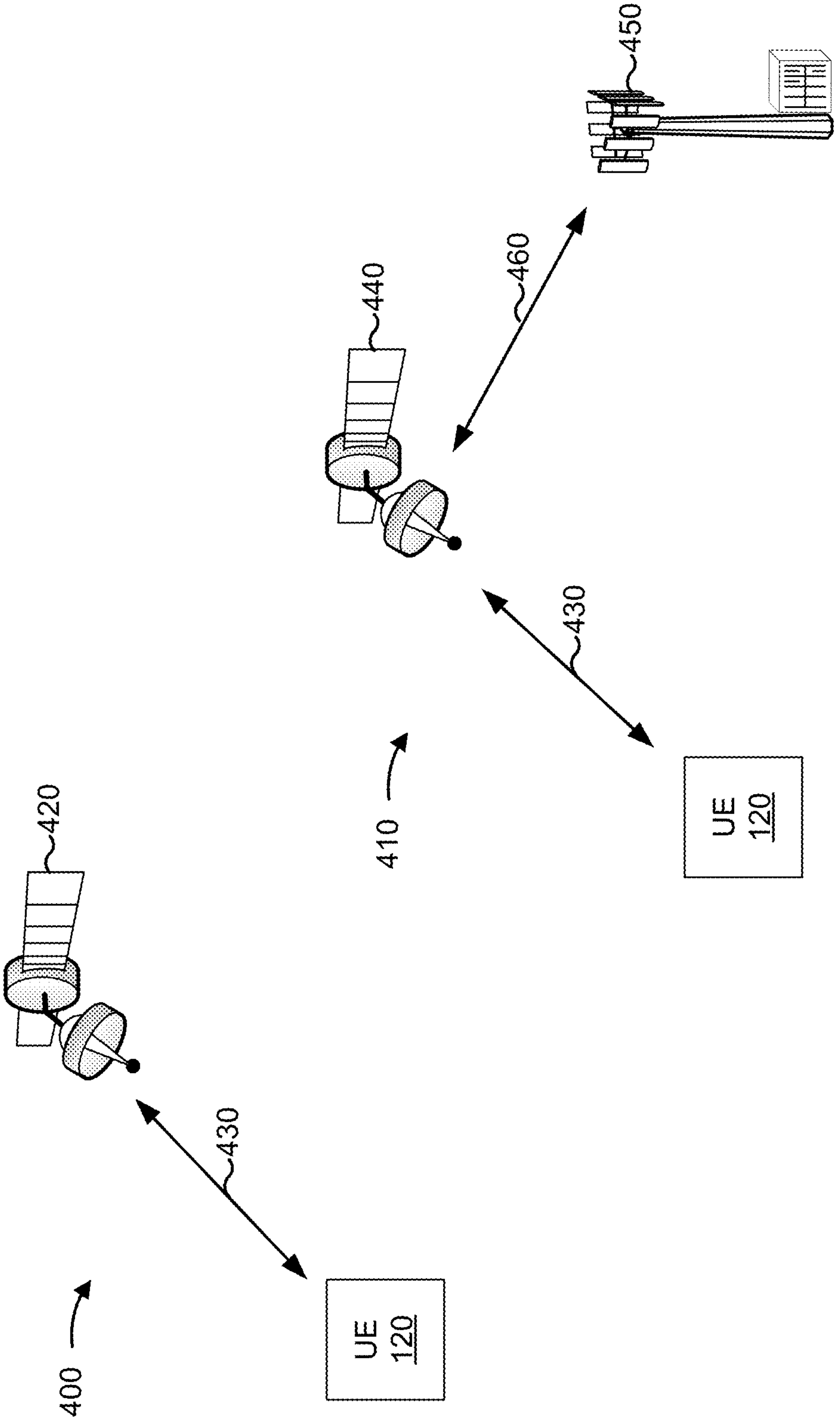
FIG. 4 is a diagram illustrating an example of a regenerative satellite deployment and an example of a transparent satellite deployment in a non-terrestrial network.

FIG. 4 is a diagram illustrating an example 400 of a regenerative satellite deployment and an example 410 of a transparent satellite deployment in a non-terrestrial network.

Example 400 shows a regenerative satellite deployment. In example 400, a UE 120 is served by a satellite 420 via a service link 430. For example, the satellite 420 may include a network node 110 (e.g., a DU, an RU, and/or a base station). In some aspects, the satellite 420 may be referred to as a non-terrestrial network node, a regenerative repeater, or an on-board processing repeater. In some aspects, the satellite 420 may demodulate an uplink radio frequency signal, and may modulate a baseband signal derived from the uplink radio signal to produce a downlink radio frequency transmission. The satellite 420 may transmit the downlink radio frequency signal on the service link 430. The satellite 420 may provide a cell that covers the UE 120.

Example 410 shows a transparent satellite deployment, which may also be referred to as a bent-pipe satellite deployment. In example 410, a UE 120 is served by a satellite 440 via the service link 430. The satellite 440 may be a transparent satellite. The satellite 440 may relay a signal received from gateway 450 via a feeder link 460. For example, the satellite may receive an uplink radio frequency transmission, and may transmit a downlink radio frequency transmission without demodulating the uplink radio frequency transmission. In some aspects, the satellite may frequency convert the uplink radio frequency transmission received on the service link 430 to a frequency of the uplink radio frequency transmission on the feeder link 460, and may amplify and/or filter the uplink radio frequency transmission. In some aspects, the UEs 120 shown in example 400 and example 410 may be associated with a Global Navigation Satellite System (GNSS) capability or a Global Positioning System (GPS) capability, though not all UEs have such capabilities. The satellite 440 may provide a cell that covers the UE 120.

The service link 430 may include a link between the satellite 440 and the UE 120, and may include one or more of an uplink or a downlink. The feeder link 460 may include a link between the satellite 440 and the gateway 450, and may include one or more of an uplink (e.g., from the UE 120 to the gateway 450) or a downlink (e.g., from the gateway 450 to the UE 120). An uplink of the service link 430 may be indicated by reference number 430-U (not shown in FIG. 4) and a downlink of the service link 430 may be indicated by reference number 430-D (not shown in FIG. 4). Similarly, an uplink of the feeder link 460 may be indicated by reference number 460-U (not shown in FIG. 4) and a downlink of the feeder link 460 may be indicated by reference number 460-D (not shown in FIG. 4).

The feeder link 460 and the service link 430 may each experience Doppler effects due to the movement of the satellites 420 and 440, and potentially movement of a UE 120. These Doppler effects may be significantly larger than in a terrestrial network. The Doppler effect on the feeder link 460 may be compensated for to some degree, but may still be associated with some amount of uncompensated frequency error. Furthermore, the gateway 450 may be associated with a residual frequency error, and/or the satellite 420/440 may be associated with an on-board frequency error. These sources of frequency error may cause a received downlink frequency at the UE 120 to drift from a target downlink frequency.

Based at least in part on communicating via the satellite 420 or 440, communications may have a relatively high round-trip-time (RTT) between the UE 120 and the satellite 420 or 440 and/or the gateway 450. The relatively high RTT may affect some types of communications, such as retransmissions and/or RA procedure messages.

As indicated above, FIG. 4 is provided as an example. Other examples may differ from what is described with regard to FIG. 4.

Figure 5:
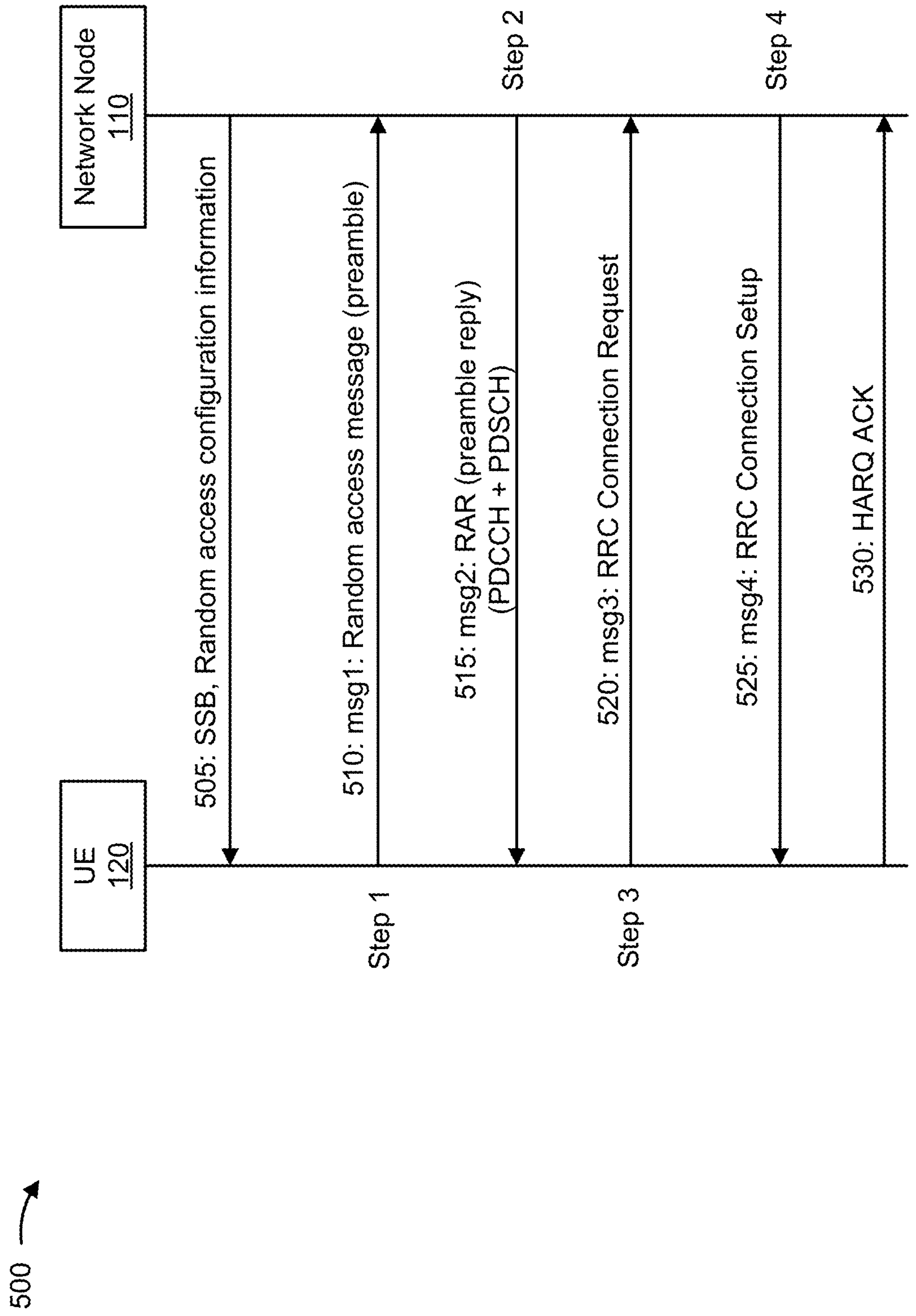
FIG. 5 is a diagram illustrating an example of a four-step random access procedure, in accordance with the present disclosure.

FIG. 5 is a diagram illustrating an example 500 of a four-step random access procedure, in accordance with the present disclosure. As shown in FIG. 5, a network node 110 and a UE 120 may communicate with one another to perform the four-step random access procedure.

As shown by reference number 505, the network node 110 may transmit, and the UE 120 may receive, one or more synchronization signal blocks (SSBs) and random access configuration information. In some aspects, the random access configuration information may be transmitted in and/or indicated by system information (e.g., in one or more system information blocks (SIBs)) and/or an SSB, such as for contention-based random access. Additionally, or alternatively, the random access configuration information may be transmitted in a RRC message and/or a physical downlink control channel (PDCCH) order message that triggers a random access channel (RACH) procedure, such as for contention-free random access. The random access configuration information may include one or more parameters to be used in the random access procedure, such as one or more parameters for transmitting an RA message (RAM) and/or one or more parameters for receiving an RA response (RAR).

As shown by reference number 510, the UE 120 may transmit a RAM, which may include a preamble (sometimes referred to as a random access preamble, a PRACH preamble, or a RAM preamble). The message that includes the preamble may be referred to as a message 1, msg1, MSG1, a first message, or an initial message in a four-step random access procedure. The random access message may include a random access preamble identifier.

As shown by reference number 515, the network node 110 may transmit an RAR as a reply to the preamble. The message that includes the RAR may be referred to as message 2, msg2, MSG2, or a second message in a four-step random access procedure. In some aspects, the RAR may indicate the detected random access preamble identifier (e.g., received from the UE 120 in msg1). Additionally, or alternatively, the RAR may indicate a resource allocation to be used by the UE 120 to transmit message 3 (msg3).

In some aspects, as part of the second step of the four-step random access procedure, the network node 110 may transmit a PDCCH communication for the RAR. The PDCCH communication may schedule a physical downlink shared channel (PDSCH) communication that includes the RAR. For example, the PDCCH communication may indicate a resource allocation for the PDSCH communication. Also as part of the second step of the four-step random access procedure, the network node 110 may transmit the PDSCH communication for the RAR, as scheduled by the PDCCH communication. The RAR may be included in a medium access control (MAC) protocol data unit (PDU) of the PDSCH communication.

As shown by reference number 520, the UE 120 may transmit an RRC connection request message. The RRC connection request message may be referred to as message 3, msg3, MSG3, or a third message of a four-step random access procedure. In some aspects, the RRC connection request may include a UE identifier, uplink control information (UCI), and/or a physical uplink shared channel (PUSCH) communication (e.g., an RRC connection request).

As shown by reference number 525, the network node 110 may transmit an RRC connection setup message. The RRC connection setup message may be referred to as message 4, msg4, MSG4, or a fourth message of a four-step random access procedure. In some aspects, the RRC connection setup message may include the detected UE identifier, a timing advance value, and/or contention resolution information.

As shown by reference number 530, if the UE 120 successfully receives the RRC connection setup message, the UE 120 may transmit a hybrid automatic repeat request (HARQ) acknowledgment (ACK).

As indicated above, FIG. 5 is provided as an example. Other examples may differ from what is described with regard to FIG. 5.

Figure 6:
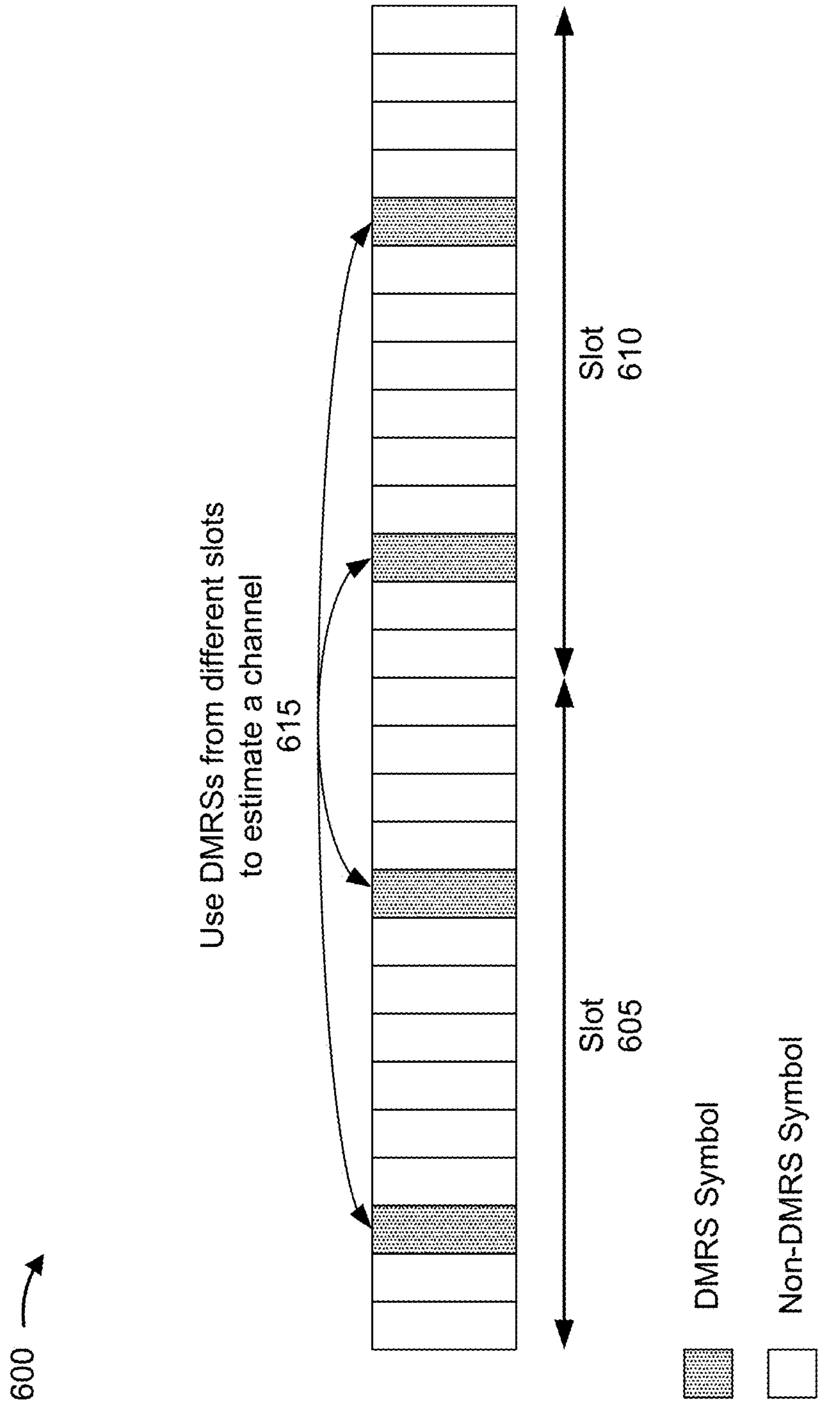
FIG. 6 is a diagram illustrating an example associated with support for demodulation reference signal bundling by a network node, in accordance with the present disclosure.

FIG. 6 is a diagram illustrating an example 600 associated with support for DMRS bundling by a base station, in accordance with the present disclosure. In context of example 600, a network node (e.g., network node 110) may communicate with a UE (e.g., UE 120). In some networks, the UE and the network node may be part of a wireless network (e.g., wireless network 100), such as a non-terrestrial network (NTN) network. The UE may be performing an access procedure to access the wireless network. The network node and the UE may be associated with one or more satellites through which the network node and the UE may communicate. In some networks, the network node may include, or be included in, a satellite.

As shown in FIG. 6, the UE may transmit a set of multiple communications using multiple slots (e.g., slot 605 and slot 610). In some networks, the UE may support DMRS bundling based at least in part on performing one or more operations described herein. Additionally, the network node may determine that DMRS bundling may be used to receive the set of multiple communications based at least in part on one or more operations described herein.

As shown by reference number 615, the network node may use DMRSs from different slots to estimate a channel 615. For example, the network node may perform DMRS bundling including estimating a channel for non-DMRS symbols at times that are between DMRS symbols of the slot 605 and DMRS symbols of the slot 610 by using DMRS symbols from both slots. Based at least in part on performing DMRS bundling, the network node may improve channel estimation based at least in part on using a nearest DMRS symbol before the non-DMRS symbols and a nearest DMRS symbol after the non-DMRS symbols instead of, for example, using only DMRS symbols within the slot 605 (e.g., only DMRS symbols before the non-DMRS symbols) or only DMRS symbols within the slot 610 (e.g., only DMRS symbols after the non-DMRS symbols). Additionally, or alternatively, the network node may perform DMRS bundling including jointly estimating a channel for non-DMRS symbols in slot 605 and slot 610 by using all DMRS symbols in both slots. The network node may apply the channel estimation to improve demodulation of data symbols and/or control symbols received between the DMRS symbols of the different slots and/or communications.

As indicated above, FIG. 6 is provided as an example. Other examples may differ from what is described with regard to FIG. 6.

DMRS bundling may be ineffective if one or more transmission parameters are not met by a transmitting device. For example, if the UE device does not maintain phase continuity and/or power consistency, channel estimation may be poor, decoding of the communications may fail, and the UE device and network node device may consume computing, power, network, and/or communication resources based at least in part on failure of the communications.

In some examples, the communications may be repetitions of an access channel message, such as a message 3 of a 4-step RACH procedure. In these examples, failure of the receiving device (e.g., a base station) to receive the message 3 may cause a failure of an attempt by the transmitting device (e.g., a UE) to connect to an associated network. In NTNs, the receiving device (e.g., a satellite associated with the base station) may be unable to decode the message 3 without DMRS bundling based at least in part on a pathloss associated with a transmission path length between the transmitting device and the receiving device.

In some aspects described herein, a UE may perform one or more procedures that support DMRS bundling at a network node. The UE may perform the one or more procedures based at least in part on communicating support for the DMRS bundling before establishing an RRC connection. The UE may support DMRS bundling for a message of an RA procedure to improve reception of the message used to establish the RRC connection. In this way, the UE may reduce failures of RA procedures, which may conserve computing, power, network, and/or communication resources that may have otherwise been used to detect and correct failure of the communications. Additionally, or alternatively, increasing a likelihood of reception by the network node may improve a latency of establishing the RRC connection and consumption of RA resources. In some aspects, the message of the RA procedure may include an initial Msg3, a retransmission of the Msg3, and/or a contention free random access (CFRA) PUSCH (e.g., a PUSCH after Msg2 in a CFRA procedure).

Figure 7:
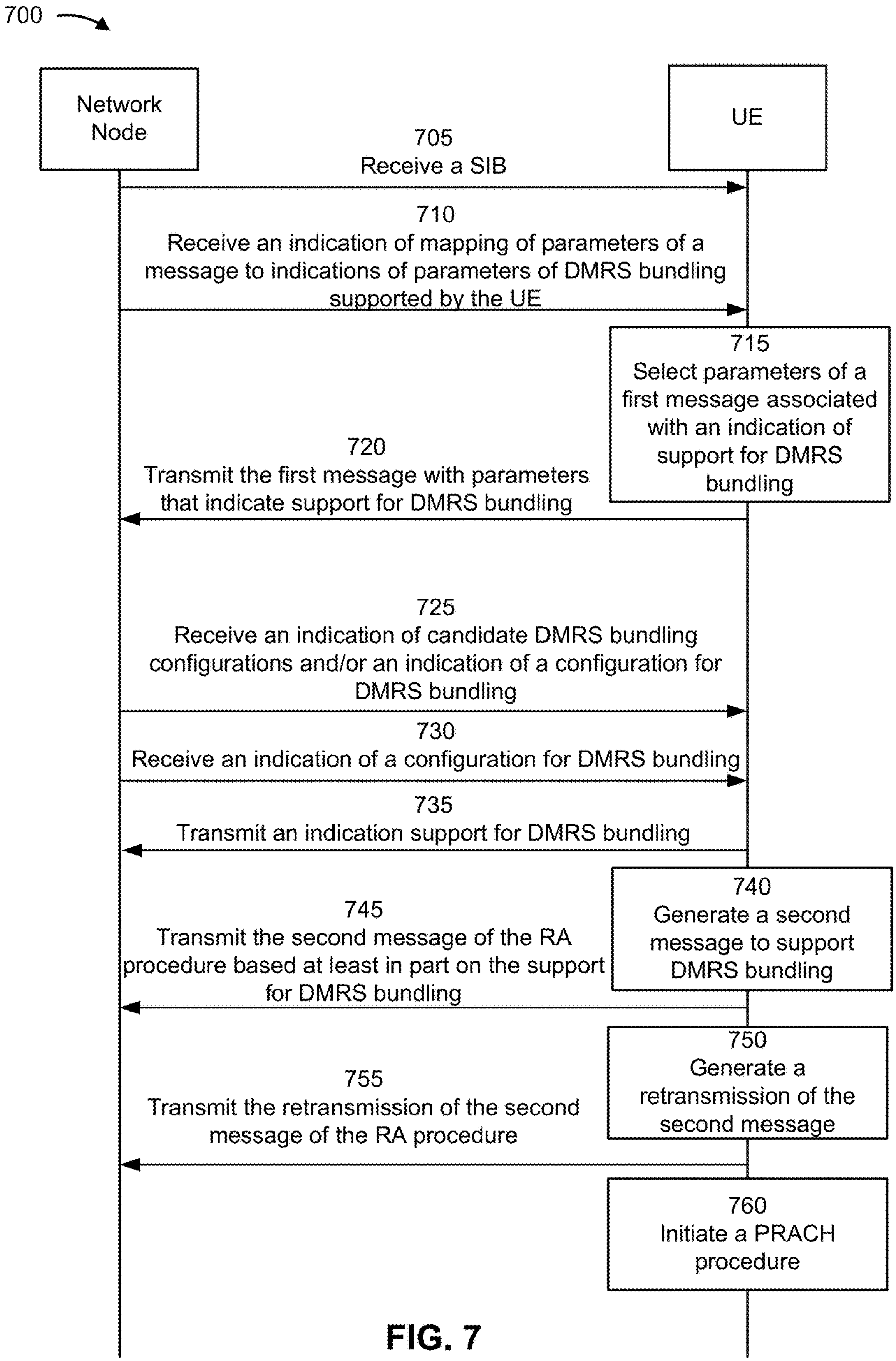
FIG. 7 is a diagram of an example associated with demodulation reference signal bundling of a message of a random access procedure, in accordance with the present disclosure.

FIG. 7 is a diagram of an example 700 associated with DMRS bundling of a message of an RA procedure, in accordance with the present disclosure. As shown in FIG. 7, a network node (e.g., network node 110, a CU, a DU, and/or an RU) may communicate with a UE (e.g., UE 120). In some aspects, the network node and the UE may be part of a wireless network (e.g., wireless network 100). The UE and the network node may have established a wireless connection prior to operations shown in FIG. 7. In some aspects, the network node may be part of an NTN network and/or an RA procedure described herein may be associated with an NTN network.

As shown by reference number 705, the network node may transmit (e.g., in a broadcast or multicast transmission), and the UE may receive, an SIB. In some aspects, the SIB may indicate one or more parameters for receiving and/or measuring SSBs from the network node. In some aspects, the SIB may indicate one or more parameters for using DMRS bundling for a message of an RA procedure. In some aspects, the SIB may indicate a mapping of parameters of a message to indications of parameters of DMRS bundling supported by the UE, as described in connection with reference number 710. For example, the SIB may map a first set of preambles to a first duration of coherence, a second set of preambles to a second duration of coherence, a first RA channel occasion to a first duration of coherence, and/or a second RA channel occasion to a second duration of coherence, among other examples. In some aspects, a message of the RA procedure is repeated (e.g., via redundancy cycling) multiple times (e.g., in order to offset the low signal to noise ratio at the receiver), and a duration of coherence spans multiple repetitions of a message of the RA procedure. In some aspects, a single redundancy version of a message of the RA procedure is transmitted over multiple time slots (e.g., in order to improve spectral efficiency), and a duration of coherence spans the multiple time slots.

For example, the SIB may indicate a configuration of a control channel search space having a periodicity that is based at least in part on the UE being in a sleep mode during a round-trip-time window (e.g., associated with an NTN network).

In some aspects, the SIB may indicate DMRS bundling alternatives among blind retransmissions for Msg3 (initial transmission or retransmissions). For example, the SIB may indicate no DMRS bundling for the blind retransmissions, DMRS bundling among every two blind retransmissions, or DMRS bundling among every four blind retransmissions. Alternatively, the UE may autonomously choose a DMRS bundling configuration (e.g., from an indicated set of candidate DMRS bundling configurations). In some aspects, the network node (e.g., within the SIB) may indicate a minimum coherence duration for using DMRS bundling (e.g., 2 slots or 4 slots, among other examples).

In some aspects, the network node may trigger blind retransmissions based at least in part on transmitting downlink control information (DCI) 0_0 with the cyclic redundancy check (CRC) bits scrambled by temporary cell radio network temporary identifier (TC-RNTI) without waiting for a decoding result of the initial transmission and previous retransmissions.

A contention resolution timer ra-ContentionResolutionTimer may be started after the initial Msg3 transmission or a Msg3 retransmission without a UE-gNB RTT delay. In some aspects, if the contention resolution timer expires and the contention resolution timer is less than UE-gNB RTT, the UE may not initiate PRACH until a UE-gNB RTT delay after the Msg3 transmission (e.g., with an additional time for the network node to process). For example, the SIB may indicate a configuration of a control channel search space having a periodicity that is based at least in part on the UE being in a sleep mode during a round-trip-time window (e.g., associated with an NTN network). In some aspects, the network node may indicate a PDCCH periodicity configuration in the SIB to be used when UE is in sleep time during the UE-network node RTT time window (Msg3 TX to Msg3 TX+UE-gNB RTT).

As shown by reference number 710, the network node may transmit, and the UE may receive, an indication of mapping of parameters of a message to indications of parameters of DMRS bundling supported by the UE. For example, the indication of the mapping may map one or more parameters of a message to support for DMRS bundling, a lack of support for DMRS bundling, and/or one or more parameters of DMRS bundling. In some aspects, the network node may transmit the indication of the mapping via a SIB, such as the SIB described in connection with reference number 705.

In some aspects, the parameters of DMRS bundling may include, for example, a coherency window associated with the DMRS bundling (e.g., 2 slots or 4 slots), and/or a number of blind retransmissions of the message having the DMRS bundling applied.

In some aspects, parameters of the message may include an RA channel occasion used for a first message (e.g., Msg1) or a DMRS pattern for a second message (e.g., Msg3) of the RA procedure. For example, a first RA channel occasion may be associated with support for DMRS bundling and a second RA channel occasion may be associated with a lack of support for DMRS bundling. In some aspects, the RA channel occasion may be associated with one or more parameters of DMRS bundling. In some aspects, a first RA channel occasion may be associated with the first duration of coherence for supporting DMRS bundling and a second RA channel occasion may be associated with the second duration of coherence for supporting DMRS bundling.

In some aspects, parameters of the message may include a preamble used in the first message. For example, a first preamble occasion may be associated with support for DMRS bundling and a second preamble may be associated with a lack of support for DMRS bundling. In some aspects, the preamble may be associated with one or more parameters of DMRS bundling. For example, a first preamble (and/or set of preambles) may be associated with a first duration of coherence for supporting DMRS bundling and a second preamble (and/or set of preambles) may be associated with a second duration of coherence for supporting DMRS bundling.

In some aspects, parameters of the message may include a DMRS pattern (e.g., positions and/or a number of DMRS symbols within a slot) used in the second message (e.g., Msg3). For example, a first DMRS pattern may be associated with support for DMRS bundling and a second DMRS pattern may be associated with a lack of support for DMRS bundling. In some aspects, the DMRS pattern may be associated with one or more parameters of DMRS bundling.

In some aspects, the UE may receive a first indication of one or more of a first available DMRS port, a first DMRS sequence, or a first DMRS pattern associated with support for DMRS bundling and/or receive a second indication of one or more of a second available DMRS port, a second DMRS sequence, or a second DMRS pattern associated with a lack of support for DMRS bundling.

In some aspects, the indication of mapping may indicate mapping of available DMRS ports, DMRS sequences, or DMRS patterns with support or lack of support for DMRS bundling.

In some aspects, the parameters of the first message (e.g., PRACH preambles and/or RACH occasions) may be partitioned, and each partition maps to a duration of coherence (e.g., phase coherence and power consistency). In some aspects, parameters of the first message (e.g., PRACH preambles and/or RACH occasions) may be partitioned into two subsets, with the first subset for UEs capable of DMRS bundling, and the second subset for other UEs. The partition and the allowed DMRS bundling configurations may be signaled in the SIB. In some aspects, the UE may select a subset of DMRS configurations and may further select a DMRS bundling configuration if the UE is capable of DMRS bundling and needs to do DMRS bundling.

The partitioning may be signaled in the SIB. The partitioning may be orthogonal to other partitioning (e.g., group A/B, Msg3 repetition, among other examples). The UE may select a partition based on its maximum duration of coherence (e.g., a capability reporting), as described in connection with reference number 715.

As shown by reference number 715, the UE may select parameters of a first message associated with an indication of support for DMRS bundling. In some aspects, the UE may select one or more of the RA channel occasion, the preamble, or the DMRS pattern used in the first message based at least in part on a supported duration (e.g., 0, 2, or 4 slots) of coherence for DMRS bundling. In some aspects, the UE may select an available DMRS port, a DMRS sequence, or a DMRS pattern associated with support or lack of support for DMRS bundling.

In some aspects, the UE may select the parameters of the first message associated with the indication of support for DMRS bundling based at least in part on a measured signal strength (e.g., RSRP) satisfying a threshold, a measured pathloss (e.g., estimated by the UE) satisfying a threshold, a satellite orbital height of a network node associated with the RA procedure, a satellite elevation angle of the network node associated with the RA procedure, a satellite orbit type of the network node associated with the RA procedure, a power class of the UE, and/or a delay requirement for communications associated with the UE, among other examples.

As shown by reference number 720, the UE may transmit, and the network node may receive, the first message with parameters that indicate support for DMRS bundling. For example, the UE may transmit the first message with parameters that indicate that the UE supports DMRS bundling, that the UE does not support DMRS bundling, and/or parameters associated with DMRS bundling that the UE supports. For example, the UE may transmit the message of the RA procedure using an available DMRS port, a DMRS sequence, or a DMRS pattern, among other examples to indicate support or lack of support for DMRS bundling.

In some aspects, the network node may indicate available DMRS ports, (e.g., a first DMRS port for UEs with DMRS bundling capability and a second DMRS port for UEs without DMRS bundling capability). The UE may select an antenna port based at least in part on a UE capability for DMRS bundling or whether it has applied DMRS bundling to Msg3.

In some aspects, the network node may indicate available DMRS sequences, (e.g., a first sequence for UEs with DMRS bundling capability a second sequence for UEs without DMRS bundling capability). The UE may select a DMRS sequence from multiple DMRS sequences to indicate the DMRS bundling capability. The UE may use DMRS antenna port 0 with the selected DMRS sequence.

In some aspects, the network node may indicate available DMRS patterns for Msg3 (e.g., a first DMRS pattern for UEs with DMRS bundling capability a second DMRS pattern for UEs without DMRS bundling capability). The UE may select a DMRS pattern from multiple DMRS patterns to indicate the DMRS bundling capability. The UE may use DMRS antenna port 0 with the selected DMRS sequence.

In some aspects, the first message may include a message 1 of the RA procedure.

As shown by reference number 725, the UE may receive an indication of candidate DMRS bundling configurations and/or an indication of a configuration for DMRS bundling. In some aspects, the candidate DMRS bundling configurations may be applied to blind retransmissions. In some aspects, the UE may receive the indication of the configuration for (e.g., to use for) DMRS bundling of the message via a transmission of a Message 2 of the RA procedure within one or more fields of the Message 2.

For example, the UE may receive the indication via repurposes bit fields in Msg2 or Msg2-b (e.g., as described herein). The SIB may define codepoints, with each representing a time domain window configuration for supporting DMRS bundling. In some aspects, the indication may include repurpose bit fields in Msg2 or Msg2-b. For example, the bits may include 2 most significant bits (MSBs) of a transmission power control (TPC) command. In some aspects, the bits may include bits from different fields, such as 1 bit from an MCS field and 1 MSB bit of the TPC command. In some aspects, the bits may be part of a new field that is dedicated to indicating the configuration.

As shown by reference number 730, the UE may receive, and the network node may transmit, an indication of a configuration for DMRS bundling. In some aspects, the network node may transmit the indication of the configuration via an implicit indication.

As shown by reference number 735, the UE may transmit, and the network node may receive, an indication of support for DMRS bundling. In some aspects, the UE may transmit the indication of support for DMRS bundling as an alternative to transmitting the first message with parameters that indicate support for DMRS bundling as described in connection with reference number 720. In some aspects, the indication of support for DMRS bundling may indicate supported parameters for DMRS bundling (e.g., a time domain window size for maintaining power coherency or a number of blind retransmissions of the message of the RA procedure having DMRS bundling applied, among other examples).

In some aspects, the set of parameters (e.g., a time domain window and/or a number of blind retransmission with DMRS bundling applied) for DMRS bundling is applied to a retransmission of the message of the RA procedure. In some aspects, a different set of parameters for DMRS bundling is applied to a retransmission of the message of the RA procedure. In some aspects, the different set of parameters may be communicated separately from the communication of parameters for an initial transmission of the message. In some aspects, DMRS bundling is not applied to the retransmission of the message of the RA procedure without a separate indication of support for DMRS bundling.

In some aspects, the UE may transmit the indication of support for DMRS bundling based at least in part on a measured signal strength satisfying a threshold, a measured pathloss satisfying a threshold, a satellite orbital height of a network node associated with the RA procedure, a satellite elevation angle of the network node associated with the RA procedure, a satellite orbit type of the network node associated with the RA procedure, a power class of the UE, and/or a delay requirement for communications associated with the UE, among other examples.

In some aspects, the UE may indicate support for DMRS bundling via an implicit indication (e.g., an indication and/or information element associated with a different communication parameter). For example, the UE may transmit an indication of a repetition request having a value that maps to the support for DMRS bundling of the message of the RA procedure.

In some aspects, one or more operations described in connection with reference numbers 705-735 may comprise communicating, before establishing an RRC connection, support for DMRS bundling of a message of an RA procedure. In some aspects, the support may apply to an initial transmission of the message having a set of parameters for DMRS bundling and/or a retransmission of the message.

In some aspects, the UE and the network node may communicate support for DMRS bundling of the message of the RA procedure including the UE generating a reduced-bit UE identification and transmitting, via a message after a Message 1 of the RA procedure and before a Message 3 of the RA procedure, the reduced-bit UE identification and a capability report that indicates support for DMRS bundling of the message of the RA procedure.

As shown by reference number 740, the UE may generate a second message to support DMRS bundling. For example, the UE may apply one or more parameters of DMRS bundling (e.g., a time domain window size and/or a number of blind retransmissions, among other examples) based at least in part on a capability of the UE.

As shown by reference number 745, the UE may transmit, and the network node may receive, the second message of the RA procedure based at least in part on the support for DMRS bundling. In some aspects, the second message may include a message 3 of the RA procedure, a message 3 retransmission, a message 5 of the RA procedure, a HARQ feedback message, a data communication transmitted before establishing the RRC connection, or a control communication transmitted before establishing the RRC connection, among other examples.

In some aspects, the network node may receive the second message of the RA without an indication of support for DMRS bundling. In some aspects, the network node may perform blind detection of DMRS bundling (e.g., not intended for DMRS bundling capability indication). For example, the network node may indicate in SIB or Msg2, or a communication standard may identify, DMRS bundling options. The DMRS bundling options may include a bundling size of 4 slots, 2 slots, or no bundling. The UE may autonomously choose a DMRS bundling option. When the network node receives the second message, the network node may perform blind detection (e.g., hypothesis testing). For example, the network may perform hypothesis testing of all DMRS bundling configurations of Msg3 based at least in part on parameters of the first message. This may improve decoding a Msg3. However, the network node may not rely on an outcome of the blind detection to determine whether DMRS bundling is supported for decoding of other messages, such as a Msg3 retransmission, a Msg5, and/or a HARQ ACK in response to Msg4, among other examples.

As shown by reference number 750, the UE may generate a retransmission of the second message. In some aspects, the retransmission may be a blind retransmission. In some aspects, a configuration for DMRS bundling of the blind retransmission may be indicated in connection with reference number 725, reference number 705, and/or in a communication standard, among other examples. For example, the UE may generate the blind retransmissions using one of the candidate DMRS bundling configurations.

As shown by reference number 755, the UE may transmit, and the network node may receive, the retransmission of the second message of the RA procedure As shown by reference number 760, the UE may initiate a PRACH procedure. In some aspects, the UE may initiate the PRACH procedure based at least in part on failing to receive a response to the message of the RA procedure within a timing window that is based at least in part on a round-trip time between the UE and a network node. For example, based at least in part on the network node being a part of an NTN network, the timing window may be longer than a timing window of a terrestrial network.

Based at least in part on the UE and the network node communicating support for DMRS bundling of a communication before establishing an RRC connection, the UE may support DMRS bundling for a message of an RA procedure to improve reception of the message used to establish the RRC connection. In this way, the UE may reduce failures of RA procedures, which may conserve computing, power, network, and/or communication resources that may have otherwise been used to detect and correct failure of the communications. Additionally, or alternatively, increasing a likelihood of reception by the network node may improve a latency of establishing the RRC connection and consumption of RA resources.

As indicated above, FIG. 7 is provided as an example. Other examples may differ from what is described with respect to FIG. 7.

Figure 8:
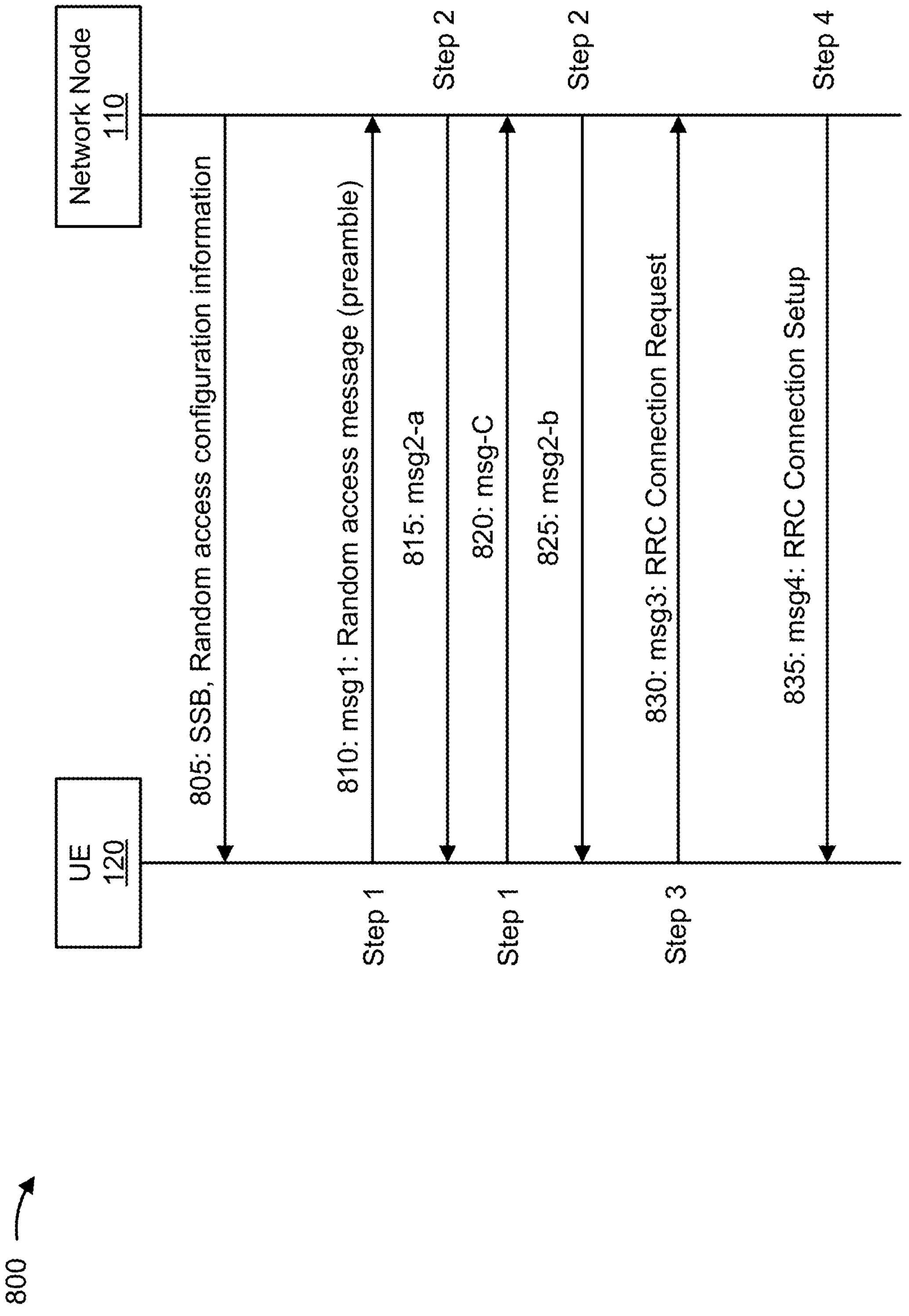
FIG. 8 is a diagram illustrating an example of a four-step random access procedure, in accordance with the present disclosure.

FIG. 8 is a diagram illustrating an example 800 of a four-step random access procedure, in accordance with the present disclosure. As shown in FIG. 8, a network node 110 and a UE 120 may communicate with one another to perform the four-step random access procedure.

As shown by reference number 805, the network node 110 may transmit, and the UE 120 may receive, one or more SSBs and random access configuration information. In some aspects, the random access configuration information may be transmitted in and/or indicated by system information (e.g., in one or more SIB s) and/or an SSB, such as for contention-based random access. Additionally, or alternatively, the random access configuration information may be transmitted in a RRC message and/or a PDCCH order message that triggers a RACH procedure, such as for contention-free random access. The random access configuration information may include one or more parameters to be used in the random access procedure, such as one or more parameters for transmitting a RAM and/or one or more parameters for receiving an RAR.

As shown by reference number 810, the UE 120 may transmit a RAM, which may include a preamble (sometimes referred to as a random access preamble, a PRACH preamble, or a RAM preamble). The message that includes the preamble may be referred to as a message 1, msg1, MSG1, a first message, or an initial message in a four-step random access procedure. The random access message may include a random access preamble identifier.

As shown by reference number 815, the network node may transmit, and the UE 120 may receive, a msg2-a. The msg2-a may indicate a RA procedure identification (RAPID), a back-off indicator, and/or a timing advance for a subsequent communication to be transmitted by the UE.

As shown by reference number 820, the UE 120 may transmit, and the network node 110 may receive, a msg-C. The msg-C may include a short Identity (e.g., s-ID), a capability report (e.g., indicating a DMRS bundling capability, supported parameters for DMRS bundling, and/or other capabilities). The capability report may include a 4-bit indication of capabilities.

In some aspects, the network node may transmit a DCI message, based at least in part on receiving the msg-C, that schedules a msg-2b. The DCI message may be scrambled by a random access radio temporary network identifier (RA-RNTI).

As shown by reference number 825, the UE 120 may receive, and the network node 110 may transmit, a msg-2b. The msg-2b may include a RAPID, the s-ID, an uplink grant, and/or a TC-RNTI. In some aspects, the msg-2b may indicate a DMRS bundling configuration.

As shown by reference number 830, the UE 120 may transmit an RRC connection request message supporting DMRS bundling based at least in part on the msg-C and/or the msg2-b. The RRC connection request message may be referred to as message 3, msg3, MSG3, or a third message of a four-step random access procedure. In some aspects, the RRC connection request may include a UE identifier, UCI, and/or a PUSCH communication (e.g., an RRC connection request).

As shown by reference number 835, the network node 110 may transmit an RRC connection setup message. The RRC connection setup message may be referred to as message 4, msg4, MSG4, or a fourth message of a four-step random access procedure. In some aspects, the RRC connection setup message may include the detected UE identifier, a timing advance value, and/or contention resolution information.

As indicated above, FIG. 8 is provided as an example. Other examples may differ from what is described with regard to FIG. 8.

Figure 9:
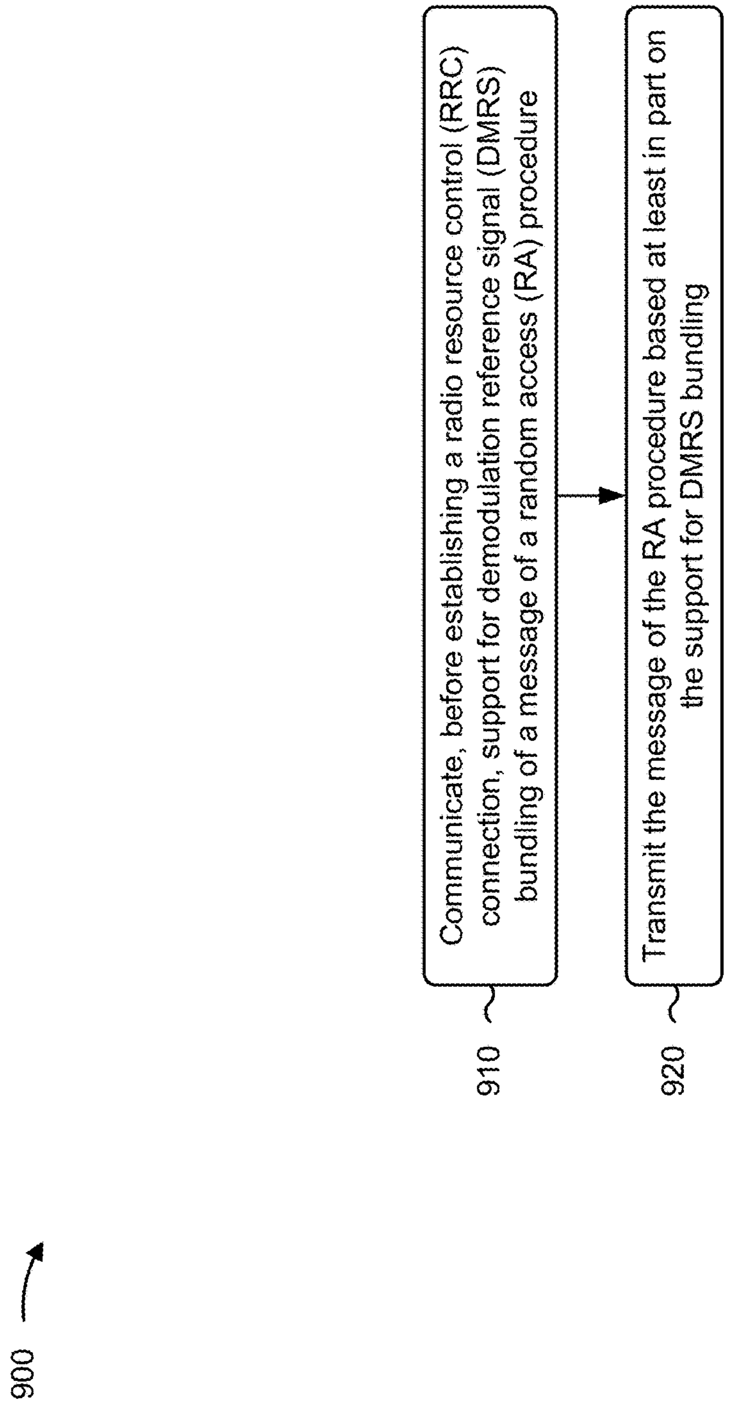
FIG. 9 is a diagram illustrating an example process performed, for example, by a UE, in accordance with the present disclosure.

FIG. 9 is a diagram illustrating an example process 900 performed, for example, by a UE, in accordance with the present disclosure. Example process 900 is an example where the UE (e.g., UE 120) performs operations associated with DMRS bundling of a message of an RA procedure.

As shown in FIG. 9, in some aspects, process 900 may include communicating, before establishing an RRC connection, support for DMRS bundling of a message of an RA procedure (block 910). For example, the UE (e.g., using communication manager 140 and/or reception component 1102 and/or transmission component 1104 depicted in FIG. 11) may communicate, before establishing an RRC connection, support for DMRS bundling of a message of an RA procedure, as described above.

As further shown in FIG. 9, in some aspects, process 900 may include transmitting the message of the RA procedure based at least in part on the support for DMRS bundling (block 920). For example, the UE (e.g., using communication manager 140 and/or transmission component 1104, depicted in FIG. 11) may transmit the message of the RA procedure based at least in part on the support for DMRS bundling, as described above.

Process 900 may include additional aspects, such as any single aspect or any combination of aspects described below and/or in connection with one or more other processes described elsewhere herein.

In a first aspect, communicating the support for DMRS bundling of the message of the RA procedure comprises transmitting an additional message of the RA procedure, wherein one or more of an RA channel occasion, a preamble, or a DMRS pattern used in the message are associated with a capability of the UE to support DMRS bundling of a subsequent message of the RA procedure.

In a second aspect, alone or in combination with the first aspect, a first set of preambles are associated with a first duration of coherence for supporting DMRS bundling, a second set of preambles are associated with a second duration of coherence for supporting DMRS bundling, a third set of preambles are associated with not using DMRS bundling, a first RA channel occasion is associated with the first duration of coherence for supporting DMRS bundling, wherein a second RA channel occasion is associated with the second duration of coherence for supporting DMRS bundling, a third RA channel occasion is associated with not using DMRS bundling, or a combination thereof.

In a third aspect, alone or in combination with one or more of the first and second aspects, process 900 includes receiving an indication via an SIB of a mapping of one or more of the first set of preambles to the first duration of coherence, the second set of preambles to the second duration of coherence, the first RA channel occasion to the first duration of coherence, or the second RA channel occasion to the second duration of coherence.

In a fourth aspect, alone or in combination with one or more of the first through third aspects, process 900 includes selecting the RA channel occasion, the preamble, or the DMRS pattern based at least in part on a supported duration of coherence for DMRS bundling.

In a fifth aspect, alone or in combination with one or more of the first through fourth aspects, the message comprises a message 3 of the RA procedure, a message 3 retransmission, a message 5 of the RA procedure, a HARQ feedback message, a data communication transmitted before establishing the RRC connection, or a control communication transmitted before establishing the RRC connection.

In a sixth aspect, alone or in combination with one or more of the first through fifth aspects, communicating the support for DMRS bundling of the message of the RA procedure comprises communicating support for an initial transmission of the message having a set of parameters for DMRS bundling.

In a seventh aspect, alone or in combination with one or more of the first through sixth aspects, the set of parameters for DMRS bundling comprise one or more of a time domain window size for maintaining power coherency, or a number of blind retransmissions of the message of the RA procedure having DMRS bundling applied.

In an eighth aspect, alone or in combination with one or more of the first through seventh aspects, the set of parameters for DMRS bundling is applied to a retransmission of the message of the RA procedure, a different set of parameters for DMRS bundling is applied to the retransmission of the message of the RA procedure, or DMRS bundling is not applied to the retransmission of the message of the RA procedure without a separate indication of support for DMRS bundling.

In a ninth aspect, alone or in combination with one or more of the first through eighth aspects, communicating the support for DMRS bundling of the message of the RA procedure comprises transmitting an indication of support for DMRS bundling.

In a tenth aspect, alone or in combination with one or more of the first through ninth aspects, transmitting the indication of support for DMRS bundling is based at least in part on one or more of a measured signal strength satisfying a threshold, a measured pathloss satisfying a threshold, a satellite orbital height of a network node associated with the RA procedure, a satellite elevation angle of the network node associated with the RA procedure, a satellite orbit type of the network node associated with the RA procedure, a power class of the UE, or a delay requirement for communications associated with the UE.

In an eleventh aspect, alone or in combination with one or more of the first through tenth aspects, the RA procedure is associated with a non-terrestrial network.

In a twelfth aspect, alone or in combination with one or more of the first through eleventh aspects, communicating the support for DMRS bundling of the message of the RA procedure comprises receiving an indication of candidate DMRS bundling configurations.

In a thirteenth aspect, alone or in combination with one or more of the first through twelfth aspects, the candidate DMRS bundling configurations indicate configurations for DMRS bundling for blind retransmissions.

In a fourteenth aspect, alone or in combination with one or more of the first through thirteenth aspects, transmitting the message of the RA procedure comprises transmitting the blind retransmissions using one of the candidate DMRS bundling configurations.

In a fifteenth aspect, alone or in combination with one or more of the first through fourteenth aspects, communicating the support for DMRS bundling of the message of the RA procedure comprises receiving an indication of a configuration to use for DMRS bundling of the message of the RA procedure via a Message 2 of the RA procedure within one or more fields of the Message 2.

In a sixteenth aspect, alone or in combination with one or more of the first through fifteenth aspects, process 900 includes initiating a PRACH procedure based at least in part on failing to receive a response to the message of the RA procedure within a timing window that is based at least in part on a round-trip time between the UE and a network node.

In a seventeenth aspect, alone or in combination with one or more of the first through sixteenth aspects, process 900 includes receiving an indication of a configuration of a control channel search space having a periodicity that is based at least in part on the UE being in a sleep mode during a round-trip-time window.

In an eighteenth aspect, alone or in combination with one or more of the first through seventeenth aspects, communicating the support for DMRS bundling of the message of the RA procedure comprises transmitting an indication of a repetition request having a value that maps to the support for DMRS bundling of the message of the RA procedure.

In a nineteenth aspect, alone or in combination with one or more of the first through eighteenth aspects, communicating the support for DMRS bundling of the message of the RA procedure comprises generating a reduced-bit UE identification, and transmitting, via a message after a Message 1 of the RA procedure and before a Message 3 of the RA procedure, the reduced-bit UE identification and a capability report that indicates support for DMRS bundling of the message of the RA procedure.

In a twentieth aspect, alone or in combination with one or more of the first through nineteenth aspects, communicating the support for DMRS bundling of the message of the RA procedure comprises receiving a first indication of one or more of a first available DMRS port, a first DMRS sequence, or a first DMRS pattern associated with support for DMRS bundling, receiving a second indication of one or more of a second available DMRS port, a second DMRS sequence, or a second DMRS pattern associated with a lack of support for DMRS bundling, and transmitting the message of the RA procedure using the first available DMRS port, the first DMRS sequence, or the first DMRS pattern to indicate support for DMRS bundling or using the second available DMRS port, the second DMRS sequence, or the second DMRS pattern to indicate a lack of support for DMRS bundling.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
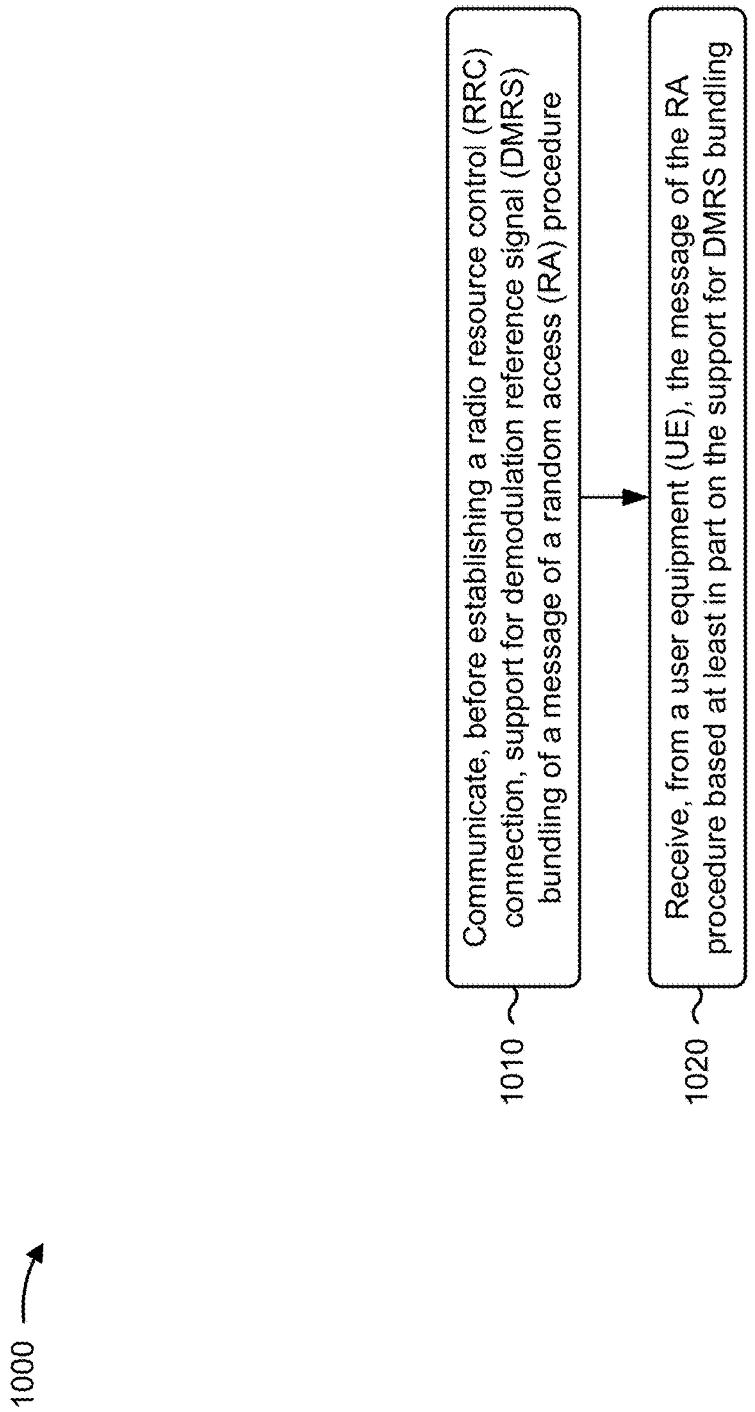
FIG. 10 is a diagram illustrating an example process performed, for example, by a network node, in accordance with the present disclosure.

FIG. 10 is a diagram illustrating an example process 1000 performed, for example, by a network node, in accordance with the present disclosure. Example process 1000 is an example where the network node (e.g., network node 110) performs operations associated with DMRS bundling of a message of an RA procedure.

As shown in FIG. 10, in some aspects, process 1000 may include communicating, before establishing an RRC connection, support for DMRS bundling of a message of an RA procedure (block 1010). For example, the network node (e.g., using communication manager and/or reception component 1202 and/or transmission component 1204 depicted in FIG. 12) may communicate, before establishing an RRC connection, support for DMRS bundling of a message of an RA procedure, as described above.

As further shown in FIG. 10, in some aspects, process 1000 may include receiving, from a UE, the message of the RA procedure based at least in part on the support for DMRS bundling (block 1020). For example, the network node (e.g., using communication manager 150 and/or reception component 1202, depicted in FIG. 12) may receive, from a UE, the message of the RA procedure based at least in part on the support for DMRS bundling, as described above.

Process 1000 may include additional aspects, such as any single aspect or any combination of aspects described below and/or in connection with one or more other processes described elsewhere herein.

In a first aspect, communicating the support for DMRS bundling of the message of the RA procedure comprises receiving an additional message of the RA procedure, wherein one or more of an RA channel occasion, a preamble, or a DMRS pattern used in the message are associated with a capability of the UE to support DMRS bundling of a subsequent message of the RA procedure.

In a second aspect, alone or in combination with the first aspect, a first set of preambles are associated with a first duration of coherence for supporting DMRS bundling, a second set of preambles are associated with a second duration of coherence for supporting DMRS bundling, a third set of preambles are associated with not using DMRS bundling, a first RA channel occasion is associated with the first duration of coherence for supporting DMRS bundling, a second RA channel occasion is associated with the second duration of coherence for supporting DMRS bundling, a third RA channel occasion is associated with not using DMRS bundling, or a combination thereof.

In a third aspect, alone or in combination with one or more of the first and second aspects, process 1000 includes transmitting an indication via an SIB of a mapping of one or more of the first set of preambles to the first duration of coherence, the second set of preambles to the second duration of coherence, the first RA channel occasion to the first duration of coherence, or the second RA channel occasion to the second duration of coherence.

In a fourth aspect, alone or in combination with one or more of the first through third aspects, the message comprises a message 3 of the RA procedure, a message 3 retransmission, a message 5 of the RA procedure, a HARQ feedback message, a data communication transmitted before establishing the RRC connection, or a control communication transmitted before establishing the RRC connection.

In a fifth aspect, alone or in combination with one or more of the first through fourth aspects, communicating the support for DMRS bundling of the message of the RA procedure comprises communicating support for an initial transmission of the message having a set of parameters for DMRS bundling.

In a sixth aspect, alone or in combination with one or more of the first through fifth aspects, the set of parameters for DMRS bundling comprise one or more of a time domain window size for maintaining power coherency, or a number of blind retransmissions of the message of the RA procedure having DMRS bundling applied.

In a seventh aspect, alone or in combination with one or more of the first through sixth aspects, the set of parameters for DMRS bundling is applied to a retransmission of the message of the RA procedure, a different set of parameters for DMRS bundling is applied to the retransmission of the message of the RA procedure, or DMRS bundling is not applied to the retransmission of the message of the RA procedure without a separate indication of support for DMRS bundling.

In an eighth aspect, alone or in combination with one or more of the first through seventh aspects, communicating the support for DMRS bundling of the message of the RA procedure comprises receiving an indication of support for DMRS bundling.

In a ninth aspect, alone or in combination with one or more of the first through eighth aspects, receiving the indication of support for DMRS bundling is based at least in part on one or more of a measured signal strength satisfying a threshold, a measured pathloss satisfying a threshold, a satellite orbital height of a network node associated with the RA procedure, a satellite elevation angle of the network node associated with the RA procedure, a satellite orbit type of the network node associated with the RA procedure, a power class of the UE, or a delay requirement for communications associated with the UE.

In a tenth aspect, alone or in combination with one or more of the first through ninth aspects, the RA procedure is associated with a non-terrestrial network.

In an eleventh aspect, alone or in combination with one or more of the first through tenth aspects, communicating the support for DMRS bundling of the message of the RA procedure comprises transmitting an indication of candidate DMRS bundling configurations.

In a twelfth aspect, alone or in combination with one or more of the first through eleventh aspects, the candidate DMRS bundling configurations indicate configurations for DMRS bundling for blind retransmissions.

In a thirteenth aspect, alone or in combination with one or more of the first through twelfth aspects, receiving the message of the RA procedure comprises receiving the blind retransmissions using one of the candidate DMRS bundling configurations.

In a fourteenth aspect, alone or in combination with one or more of the first through thirteenth aspects, communicating the support for DMRS bundling of the message of the RA procedure comprises transmitting an indication of a configuration to use for DMRS bundling of the message of the RA procedure via a Message 2 of the RA procedure within one or more fields of the Message 2.

In a fifteenth aspect, alone or in combination with one or more of the first through fourteenth aspects, process 1000 includes transmitting an indication of a configuration of a control channel search space having a periodicity that is based at least in part on the UE being in a sleep mode during a round-trip-time window.

In a sixteenth aspect, alone or in combination with one or more of the first through fifteenth aspects, communicating the support for DMRS bundling of the message of the RA procedure comprises receiving an indication of a repetition request having a value that maps to the support for DMRS bundling of the message of the RA procedure.

In a seventeenth aspect, alone or in combination with one or more of the first through sixteenth aspects, communicating the support for DMRS bundling of the message of the RA procedure comprises receiving, via a message after a Message 1 of the RA procedure and before a Message 3 of the RA procedure, a reduced-bit UE identification and a capability report that indicates support for DMRS bundling of the message of the RA procedure.

In an eighteenth aspect, alone or in combination with one or more of the first through seventeenth aspects, communicating the support for DMRS bundling of the message of the RA procedure comprises transmitting a first indication of one or more of a first available DMRS port, a first DMRS sequence, or a first DMRS pattern associated with support for DMRS bundling, transmitting a second indication of one or more of a second available DMRS port, a second DMRS sequence, or a second DMRS pattern associated with a lack of support for DMRS bundling, and receiving the message of the RA procedure using the first available DMRS port, the first DMRS sequence, or the first DMRS pattern to indicate support for DMRS bundling or using the second available DMRS port, the second DMRS sequence, or the second DMRS pattern to indicate a lack of support for DMRS bundling.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
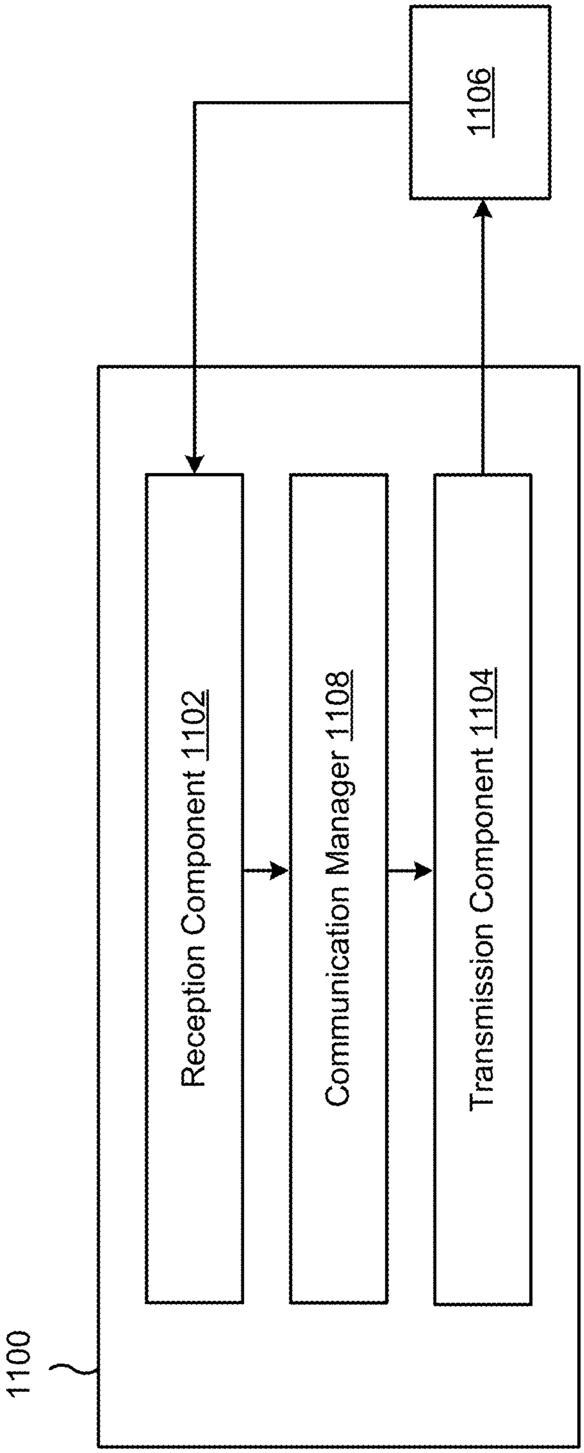
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a communication manager 1108 (e.g., the communication manager 140).

In some aspects, the apparatus 1100 may be configured to perform one or more operations described herein in connection with FIGS. 7-8. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory (e.g., one or more memories). For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The reception component 1102 and/or transmission component 1104 may communicate, before establishing an RRC connection, support for DMRS bundling of a message of an RA procedure. The transmission component 1104 may transmit the message of the RA procedure based at least in part on the support for DMRS bundling.

The reception component 1102 may receive an indication via an SIB of a mapping of one or more of the first set of preambles to the first duration of coherence, the second set of preambles to the second duration of coherence, the first RA channel occasion to the first duration of coherence, or the second RA channel occasion to the second duration of coherence.

The communication manager 1108 may select the RA channel occasion, the preamble, or the DMRS pattern based at least in part on a supported duration of coherence for DMRS bundling.

The communication manager 1108 may initiate a PRACH procedure based at least in part on failing to receive a response to the message of the RA procedure within a timing window that is based at least in part on a round-trip time between the UE and a network node.

The reception component 1102 may receive an indication of a configuration of a control channel search space having a periodicity that is based at least in part on the UE being in a sleep mode during a round-trip-time window.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
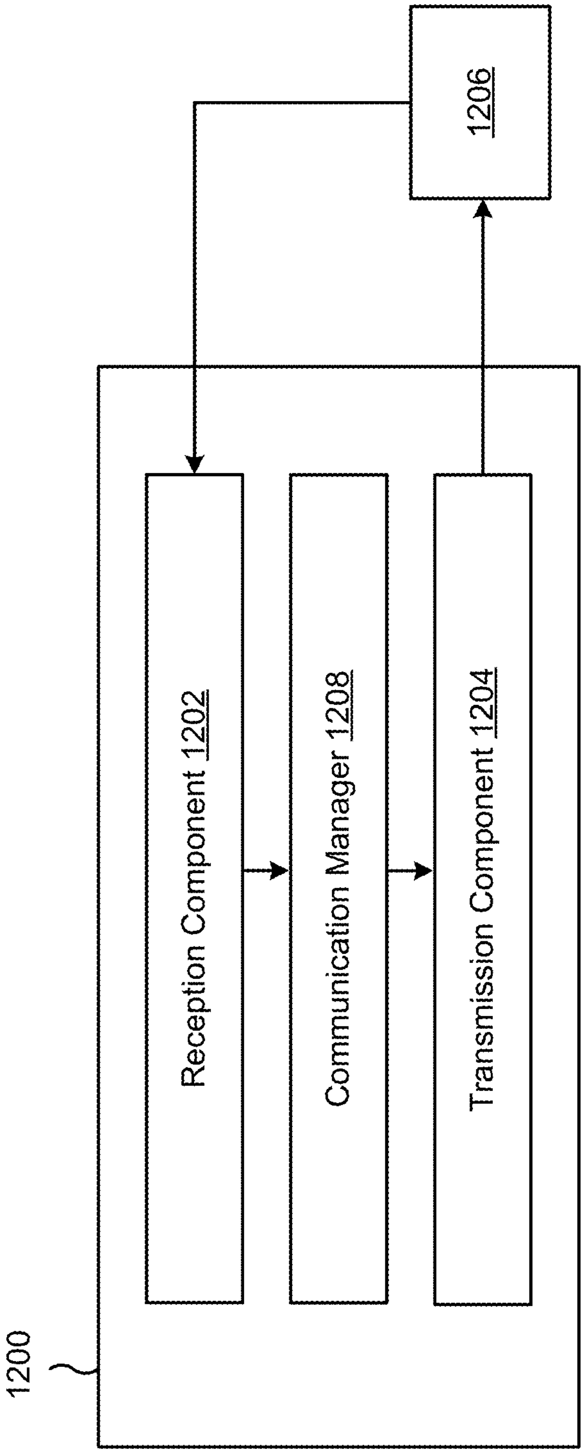
FIG. 12 is a diagram of an example apparatus for wireless communication, in accordance with the present disclosure.

FIG. 12 is a diagram of an example apparatus 1200 for wireless communication, in accordance with the present disclosure. The apparatus 1200 may be a network node, or a network node may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include a communication manager 1208 (e.g., the communication manager 150).

In some aspects, the apparatus 1200 may be configured to perform one or more operations described herein in connection with FIGS. 7-8. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the network node described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the network node described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the network node described in connection with FIG. 2. In some aspects, the transmission component 1204 may be co-located with the reception component 1202 in a transceiver.

The reception component 1202 and/or transmission component 1204 may communicate, before establishing an RRC connection, support for DMRS bundling of a message of an RA procedure. The reception component 1202 may receive, from a UE, the message of the RA procedure based at least in part on the support for DMRS bundling.

The transmission component 1204 may transmit an indication via an SIB of a mapping of one or more of the first set of preambles to the first duration of coherence, the second set of preambles to the second duration of coherence, the first RA channel occasion to the first duration of coherence, or the second RA channel occasion to the second duration of coherence.

The transmission component 1204 may transmit an indication of a configuration of a control channel search space having a periodicity that is based at least in part on the UE being in a sleep mode during a round-trip-time window.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a user equipment (UE), comprising: communicating, before establishing a radio resource control (RRC) connection, support for demodulation reference signal (DMRS) bundling of a message of a random access (RA) procedure; and transmitting the message of the RA procedure based at least in part on the support for DMRS bundling.

Aspect 2: The method of Aspect 1, wherein communicating the support for DMRS bundling of the message of the RA procedure comprises transmitting an additional message of the RA procedure, wherein one or more of an RA channel occasion, a preamble, or a DMRS pattern used in the message are associated with a capability of the UE to support DMRS bundling of a subsequent message of the RA procedure.

Aspect 3: The method of Aspect 2, wherein a first set of preambles are associated with a first duration of coherence for supporting DMRS bundling, wherein a second set of preambles are associated with a second duration of coherence for supporting DMRS bundling, wherein a third set of preambles are associated with not using DMRS bundling, wherein a first RA channel occasion is associated with the first duration of coherence for supporting DMRS bundling, wherein a second RA channel occasion is associated with the second duration of coherence for supporting DMRS bundling, wherein a third RA channel occasion is associated with not using DMRS bundling, or a combination thereof.

Aspect 4: The method of Aspect 3, further comprising receiving an indication via a system information block (SIB) of a mapping of one or more of: the first set of preambles to the first duration of coherence, the second set of preambles to the second duration of coherence, the first RA channel occasion to the first duration of coherence, or the second RA channel occasion to the second duration of coherence.

Aspect 5: The method of any of Aspects 2-4, further comprising selecting the RA channel occasion, the preamble, or the DMRS pattern based at least in part on a supported duration of coherence for DMRS bundling.

Aspect 6: The method of any of Aspects 1-5, wherein the message comprises: a message 3 of the RA procedure, a message 3 retransmission, a message 5 of the RA procedure, a hybrid automatic repeat request (HARQ) feedback message, a data communication transmitted before establishing the RRC connection, or a control communication transmitted before establishing the RRC connection.

Aspect 7: The method of any of Aspects 1-6, wherein communicating the support for DMRS bundling of the message of the RA procedure comprises communicating support for an initial transmission of the message having a set of parameters for DMRS bundling.

Aspect 8: The method of Aspect 7, wherein the set of parameters for DMRS bundling comprise one or more of: a time domain window size for maintaining power coherency, or a number of blind retransmissions of the message of the RA procedure having DMRS bundling applied.

Aspect 9: The method of any of Aspects 7-8, wherein the set of parameters for DMRS bundling is applied to a retransmission of the message of the RA procedure, wherein a different set of parameters for DMRS bundling is applied to the retransmission of the message of the RA procedure, or wherein DMRS bundling is not applied to the retransmission of the message of the RA procedure without a separate indication of support for DMRS bundling.

Aspect 10: The method of any of Aspects 1-9, wherein communicating the support for DMRS bundling of the message of the RA procedure comprises: transmitting an indication of support for DMRS bundling.

Aspect 11: The method of Aspect 10, wherein transmitting the indication of support for DMRS bundling is based at least in part on one or more of: a measured signal strength satisfying a threshold, a measured pathloss satisfying a threshold, a satellite orbital height of a network node associated with the RA procedure, a satellite elevation angle of the network node associated with the RA procedure, a satellite orbit type of the network node associated with the RA procedure, a power class of the UE, or a delay requirement for communications associated with the UE.

Aspect 12: The method of any of Aspects 1-11, wherein the RA procedure is associated with a non-terrestrial network.

Aspect 13: The method of any of Aspects 1-12, wherein communicating the support for DMRS bundling of the message of the RA procedure comprises: receiving an indication of candidate DMRS bundling configurations.

Aspect 14: The method of Aspect 13, wherein the candidate DMRS bundling configurations indicate configurations for DMRS bundling for blind retransmissions.

Aspect 15: The method of Aspect 14, wherein transmitting the message of the RA procedure comprises: transmitting the blind retransmissions using one of the candidate DMRS bundling configurations.

Aspect 16: The method of any of Aspects 13-15, wherein communicating the support for DMRS bundling of the message of the RA procedure comprises: receiving an indication of a configuration to use for DMRS bundling of the message of the RA procedure via a Message 2 of the RA procedure within one or more fields of the Message 2.

Aspect 17: The method of any of Aspects 1-16, further comprising: initiating a physical random access channel (PRACH) procedure based at least in part on failing to receive a response to the message of the RA procedure within a timing window that is based at least in part on a round-trip time between the UE and a network node.

Aspect 18: The method of any of Aspects 1-17, further comprising: receiving an indication of a configuration of a control channel search space having a periodicity that is based at least in part on the UE being in a sleep mode during a round-trip-time window.

Aspect 19: The method of any of Aspects 1-18, wherein communicating the support for DMRS bundling of the message of the RA procedure comprises: transmitting an indication of a repetition request having a value that maps to the support for DMRS bundling of the message of the RA procedure.

Aspect 20: The method of any of Aspects 1-19, wherein communicating the support for DMRS bundling of the message of the RA procedure comprises: generating a reduced-bit UE identification; and transmitting, via a message after a Message 1 of the RA procedure and before a Message 3 of the RA procedure, the reduced-bit UE identification and a capability report that indicates support for DMRS bundling of the message of the RA procedure.

Aspect 21: The method of any of Aspects 1-20, wherein communicating the support for DMRS bundling of the message of the RA procedure comprises: receiving a first indication of one or more of a first available DMRS port, a first DMRS sequence, or a first DMRS pattern associated with support for DMRS bundling; receiving a second indication of one or more of a second available DMRS port, a second DMRS sequence, or a second DMRS pattern associated with a lack of support for DMRS bundling; and transmitting the message of the RA procedure using the first available DMRS port, the first DMRS sequence, or the first DMRS pattern to indicate support for DMRS bundling or using the second available DMRS port, the second DMRS sequence, or the second DMRS pattern to indicate a lack of support for DMRS bundling.

Aspect 22: A method of wireless communication performed by a network node, comprising: communicating, before establishing a radio resource control (RRC) connection, support for demodulation reference signal (DMRS) bundling of a message of a random access (RA) procedure; and receiving, from a user equipment (UE), the message of the RA procedure based at least in part on the support for DMRS bundling.

Aspect 23: The method of Aspect 22, wherein communicating the support for DMRS bundling of the message of the RA procedure comprises receiving an additional message of the RA procedure, wherein one or more of an RA channel occasion, a preamble, or a DMRS pattern used in the message are associated with a capability of the UE to support DMRS bundling of a subsequent message of the RA procedure.

Aspect 24: The method of Aspect 23, wherein a first set of preambles are associated with a first duration of coherence for supporting DMRS bundling, wherein a second set of preambles are associated with a second duration of coherence for supporting DMRS bundling, wherein a third set of preambles are associated with not using DMRS bundling, wherein a first RA channel occasion is associated with the first duration of coherence for supporting DMRS bundling, wherein a second RA channel occasion is associated with the second duration of coherence for supporting DMRS bundling, wherein a third RA channel occasion is associated with not using DMRS bundling, or a combination thereof.

Aspect 25: The method of Aspect 24, further comprising transmitting an indication via a system information block (SIB) of a mapping of one or more of: the first set of preambles to the first duration of coherence, the second set of preambles to the second duration of coherence, the first RA channel occasion to the first duration of coherence, or the second RA channel occasion to the second duration of coherence.

Aspect 26: The method of any of Aspects 22-25, wherein the message comprises: a message 3 of the RA procedure, a message 3 retransmission, a message 5 of the RA procedure, a hybrid automatic repeat request (HARQ) feedback message, a data communication transmitted before establishing the RRC connection, or a control communication transmitted before establishing the RRC connection.

Aspect 27: The method of any of Aspects 22-26, wherein communicating the support for DMRS bundling of the message of the RA procedure comprises communicating support for an initial transmission of the message having a set of parameters for DMRS bundling.

Aspect 28: The method of Aspect 27, wherein the set of parameters for DMRS bundling comprise one or more of: a time domain window size for maintaining power coherency, or a number of blind retransmissions of the message of the RA procedure having DMRS bundling applied.

Aspect 29: The method of any of Aspects 27-28, wherein the set of parameters for DMRS bundling is applied to a retransmission of the message of the RA procedure, wherein a different set of parameters for DMRS bundling is applied to the retransmission of the message of the RA procedure, or wherein DMRS bundling is not applied to the retransmission of the message of the RA procedure without a separate indication of support for DMRS bundling.

Aspect 30: The method of any of Aspects 22-29, wherein communicating the support for DMRS bundling of the message of the RA procedure comprises: receiving an indication of support for DMRS bundling.

Aspect 31: The method of Aspect 30, wherein receiving the indication of support for DMRS bundling is based at least in part on one or more of: a measured signal strength satisfying a threshold, a measured pathloss satisfying a threshold, a satellite orbital height of a network node associated with the RA procedure, a satellite elevation angle of the network node associated with the RA procedure, a satellite orbit type of the network node associated with the RA procedure, a power class of the UE, or a delay requirement for communications associated with the UE.

Aspect 32: The method of any of Aspects 22-31, wherein the RA procedure is associated with a non-terrestrial network.

Aspect 33: The method of any of Aspects 22-32, wherein communicating the support for DMRS bundling of the message of the RA procedure comprises: transmitting an indication of candidate DMRS bundling configurations.

Aspect 34: The method of Aspect 33, wherein the candidate DMRS bundling configurations indicate configurations for DMRS bundling for blind retransmissions.

Aspect 35: The method of Aspect 34, wherein receiving the message of the RA procedure comprises: receiving the blind retransmissions using one of the candidate DMRS bundling configurations.

Aspect 36: The method of any of Aspects 33-35, wherein communicating the support for DMRS bundling of the message of the RA procedure comprises: transmitting an indication of a configuration to use for DMRS bundling of the message of the RA procedure via a Message 2 of the RA procedure within one or more fields of the Message 2.

Aspect 37: The method of any of Aspects 22-36, further comprising: transmitting an indication of a configuration of a control channel search space having a periodicity that is based at least in part on the UE being in a sleep mode during a round-trip-time window.

Aspect 38: The method of any of Aspects 22-37, wherein communicating the support for DMRS bundling of the message of the RA procedure comprises: receiving an indication of a repetition request having a value that maps to the support for DMRS bundling of the message of the RA procedure.

Aspect 39: The method of any of Aspects 22-38, wherein communicating the support for DMRS bundling of the message of the RA procedure comprises: receiving, via a message after a Message 1 of the RA procedure and before a Message 3 of the RA procedure, a reduced-bit UE identification and a capability report that indicates support for DMRS bundling of the message of the RA procedure.

Aspect 40: The method of any of Aspects 22-39, wherein communicating the support for DMRS bundling of the message of the RA procedure comprises: transmitting a first indication of one or more of a first available DMRS port, a first DMRS sequence, or a first DMRS pattern associated with support for DMRS bundling; transmitting a second indication of one or more of a second available DMRS port, a second DMRS sequence, or a second DMRS pattern associated with a lack of support for DMRS bundling; and receiving the message of the RA procedure using the first available DMRS port, the first DMRS sequence, or the first DMRS pattern to indicate support for DMRS bundling or using the second available DMRS port, the second DMRS sequence, or the second DMRS pattern to indicate a lack of support for DMRS bundling.

Aspect 41: An apparatus for wireless communication at a device, comprising a processor; memory coupled with the processor; and instructions stored in the memory and executable by the processor to cause the apparatus to perform the method of one or more of Aspects 1-40.

Aspect 42: A device for wireless communication, comprising one or more memories and one or more processors coupled to the one or more memories, which are configured, individually or in any combination, to perform the method of one or more of Aspects 1-40.

Aspect 43: An apparatus for wireless communication, comprising at least one means for performing the method of one or more of Aspects 1-40.

Aspect 44: A non-transitory computer-readable medium storing code for wireless communication, the code comprising instructions executable by a processor to perform the method of one or more of Aspects 1-40.

Aspect 45: A non-transitory computer-readable medium storing a set of instructions for wireless communication, the set of instructions comprising one or more instructions that, when executed by one or more processors of a device, cause the device to perform the method of one or more of Aspects 1-40.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a++b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

one or more memories; and one or more processors coupled to the one or more memories, which are configured, individually or in any combination, to:

communicate, to a network node and before establishing a radio resource control (RRC) connection, an indication of support for demodulation reference signal (DMRS) bundling of a message of a random access (RA) procedure, wherein the one or more processors, to communicate the support for DMRS bundling of the message of the RA procedure, are configured, individually or in any combination, to transmit an additional message of the RA procedure, wherein one or more of an RA channel occasion, a preamble, or a DMRS pattern used in the message are associated with a capability of the UE to support DMRS bundling of a subsequent message of the RA procedure; and transmit, to the network node, the message of the RA procedure based at least in part on the support for DMRS bundling.

2. The UE of claim 1, wherein a first set of preambles are associated with a first duration of coherence for supporting DMRS bundling, wherein a second set of preambles are associated with a second duration of coherence for supporting DMRS bundling, wherein a third set of preambles are associated with not using DMRS bundling, wherein a first RA channel occasion is associated with the first duration of coherence for supporting DMRS bundling, wherein a second RA channel occasion is associated with the second duration of coherence for supporting DMRS bundling, wherein a third RA channel occasion is associated with not using DMRS bundling, or a combination thereof.

3. The UE of claim 2, wherein the one or more processors are further configured, individually or in any combination, to receive an indication via a system information block (SIB) of a mapping of one or more of:

the first set of preambles to the first duration of coherence, the second set of preambles to the second duration of coherence, the first RA channel occasion to the first duration of coherence, or the second RA channel occasion to the second duration of coherence.

4. The UE of claim 1, wherein the one or more processors are further configured, individually or in any combination, to select the RA channel occasion, the preamble, or the DMRS pattern based at least in part on a supported duration of coherence for DMRS bundling.

5. The UE of claim 1, wherein the message comprises:

a message 3 of the RA procedure, a message 3 retransmission, a message 5 of the RA procedure, a hybrid automatic repeat request (HARQ) feedback message, a data communication transmitted before establishing the RRC connection, or a control communication transmitted before establishing the RRC connection.

6. The UE of claim 1, wherein the one or more processors, to communicate the support for DMRS bundling of the message of the RA procedure, are configured, individually or in any combination, to communicate support for an initial transmission of the message having a set of parameters for DMRS bundling.

7. The UE of claim 6, wherein the set of parameters for DMRS bundling comprise one or more of:

a time domain window size for maintaining power coherency, or a number of blind retransmissions of the message of the RA procedure having DMRS bundling applied.

8. The UE of claim 6, wherein the set of parameters for DMRS bundling is applied to a retransmission of the message of the RA procedure, wherein a different set of parameters for DMRS bundling is applied to the retransmission of the message of the RA procedure, or wherein DMRS bundling is not applied to the retransmission of the message of the RA procedure without a separate indication of support for DMRS bundling.

9. The UE of claim 1, wherein the one or more processors, to communicate the support for DMRS bundling of the message of the RA procedure, are configured, individually or in any combination, to:

transmit an indication of support for DMRS bundling.

10. The UE of claim 9, wherein transmitting the indication of support for DMRS bundling is based at least in part on one or more of:

a measured signal strength satisfying a threshold, a measured pathloss satisfying a threshold, a satellite orbital height of a network node associated with the RA procedure, a satellite elevation angle of the network node associated with the RA procedure, a satellite orbit type of the network node associated with the RA procedure, a power class of the UE, or a delay requirement for communications associated with the UE.

11. The UE of claim 1, wherein the RA procedure is associated with a non-terrestrial network.

12. The UE of claim 1, wherein the one or more processors, to communicate the support for DMRS bundling of the message of the RA procedure, are configured, individually or in any combination, to:

receive an indication of candidate DMRS bundling configurations.

13. The UE of claim 12, wherein the candidate DMRS bundling configurations indicate configurations for DMRS bundling for blind retransmissions.

14. The UE of claim 13, wherein the one or more processors, to transmit the message of the RA procedure, are configured, individually or in any combination, to:

transmit the blind retransmissions using one of the candidate DMRS bundling configurations.

15. The UE of claim 12, wherein the one or more processors, to communicate the support for DMRS bundling of the message of the RA procedure, are configured, individually or in any combination, to:

receive an indication of a configuration to use for DMRS bundling of the message of the RA procedure via a Message 2 of the RA procedure within one or more fields of the Message 2.

16. The UE of claim 1, wherein the one or more processors are further configured, individually or in any combination, to:

initiate a physical random access channel (PRACH) procedure based at least in part on failing to receive a response to the message of the RA procedure within a timing window that is based at least in part on a round-trip time between the UE and a network node.

17. The UE of claim 1, wherein the one or more processors are further configured, individually or in any combination, to:

receive an indication of a configuration of a control channel search space having a periodicity that is based at least in part on the UE being in a sleep mode during a round-trip-time window.

18. The UE of claim 1, wherein the one or more processors, to communicate the support for DMRS bundling of the message of the RA procedure, are configured, individually or in any combination, to:

transmit an indication of a repetition request having a value that maps to the support for DMRS bundling of the message of the RA procedure.

19. The UE of claim 1, wherein the one or more processors, to communicate the support for DMRS bundling of the message of the RA procedure, are configured, individually or in any combination, to:

generate a reduced-bit UE identification; and transmit, via a message after a Message 1 of the RA procedure and before a Message 3 of the RA procedure, the reduced-bit UE identification and a capability report that indicates support for DMRS bundling of the message of the RA procedure.

20. The UE of claim 1, wherein the one or more processors, to communicate the support for DMRS bundling of the message of the RA procedure, are configured, individually or in any combination, to:

receive a first indication of one or more of a first available DMRS port, a first DMRS sequence, or a first DMRS pattern associated with support for DMRS bundling;

receive a second indication of one or more of a second available DMRS port, a second DMRS sequence, or a second DMRS pattern associated with a lack of support for DMRS bundling; and transmit the message of the RA procedure using the first available DMRS port, the first DMRS sequence, or the first DMRS pattern to indicate support for DMRS bundling or using the second available DMRS port, the second DMRS sequence, or the second DMRS pattern to indicate a lack of support for DMRS bundling.

21. A user equipment (UE) for wireless communication, comprising:

one or more memories; and one or more processors coupled to the one or more memories, which are configured, individually or in any combination, to:

communicate, to a network node and before establishing a radio resource control (RRC) connection, an indication of support for demodulation reference signal (DMRS) bundling of a message of a random access (RA) procedure;

transmit, to the network node, the message of the RA procedure based at least in part on the support for DMRS bundling; and initiate a physical random access channel (PRACH) procedure based at least in part on failing to receive a response to the message of the RA procedure within a timing window that is based at least in part on a round-trip time between the UE and a network node, or receive an indication of a configuration of a control channel search space having a periodicity that is based at least in part on the UE being in a sleep mode during a round-trip-time window.

22. The UE of claim 21, wherein the one or more processors, to communicate the support for DMRS bundling of the message of the RA procedure, are configured, individually or in any combination, to transmit an additional message of the RA procedure, wherein one or more of an RA channel occasion, a preamble, or a DMRS pattern used in the message are associated with a capability of the UE to support DMRS bundling of a subsequent message of the RA procedure, wherein a first set of preambles are associated with a first duration of coherence for supporting DMRS bundling, wherein a second set of preambles are associated with a second duration of coherence for supporting DMRS bundling, wherein a third set of preambles are associated with not using DMRS bundling, wherein a first RA channel occasion is associated with the first duration of coherence for supporting DMRS bundling, wherein a second RA channel occasion is associated with the second duration of coherence for supporting DMRS bundling, wherein a third RA channel occasion is associated with not using DMRS bundling, or a combination thereof.

23. The UE of claim 22, wherein the one or more processors are further configured, individually or in any combination, to receive an indication via a system information block (SIB) of a mapping of one or more of:

the first set of preambles to the first duration of coherence, the second set of preambles to the second duration of coherence, the first RA channel occasion to the first duration of coherence, or the second RA channel occasion to the second duration of coherence.

24. The UE of claim 21, wherein the one or more processors, to communicate the support for DMRS bundling of the message of the RA procedure, are configured, individually or in any combination, to transmit an additional message of the RA procedure, wherein one or more of an RA channel occasion, a preamble, or a DMRS pattern used in the message are associated with a capability of the UE to support DMRS bundling of a subsequent message of the RA procedure, wherein the one or more processors are further configured, individually or in any combination, to select the RA channel occasion, the preamble, or the DMRS pattern based at least in part on a supported duration of coherence for DMRS bundling.

25. A user equipment (UE) for wireless communication, comprising:

one or more memories; and one or more processors coupled to the one or more memories, which are configured, individually or in any combination, to:

communicate, to a network node and before establishing a radio resource control (RRC) connection, an indication of support for demodulation reference signal (DMRS) bundling of a message of a random access (RA) procedure, wherein the one or more processors, to communicate the support for DMRS bundling of the message of the RA procedure, are configured, individually or in any combination, to transmit an indication of a repetition request having a value that maps to the support for DMRS bundling of the message of the RA procedure; and transmit, to the network node, the message of the RA procedure based at least in part on the support for DMRS bundling.

26. The UE of claim 25, wherein the one or more processors, to communicate the support for DMRS bundling of the message of the RA procedure, are configured, individually or in any combination, to transmit an additional message of the RA procedure, wherein one or more of an RA channel occasion, a preamble, or a DMRS pattern used in the message are associated with a capability of the UE to support DMRS bundling of a subsequent message of the RA procedure, wherein a first set of preambles are associated with a first duration of coherence for supporting DMRS bundling, wherein a second set of preambles are associated with a second duration of coherence for supporting DMRS bundling, wherein a third set of preambles are associated with not using DMRS bundling, wherein a first RA channel occasion is associated with the first duration of coherence for supporting DMRS bundling, wherein a second RA channel occasion is associated with the second duration of coherence for supporting DMRS bundling, wherein a third RA channel occasion is associated with not using DMRS bundling, or a combination thereof.

27. The UE of claim 25, wherein the one or more processors, to communicate the support for DMRS bundling of the message of the RA procedure, are configured, individually or in any combination, to transmit an additional message of the RA procedure, wherein one or more of an RA channel occasion, a preamble, or a DMRS pattern used in the message are associated with a capability of the UE to support DMRS bundling of a subsequent message of the RA procedure, wherein the one or more processors are further configured, individually or in any combination, to select the RA channel occasion, the preamble, or the DMRS pattern based at least in part on a supported duration of coherence for DMRS bundling.

28. A user equipment (UE) for wireless communication, comprising one or more memories; and one or more processors coupled to the one or more memories, which are configured, individually or in any combination, to:

communicate, to a network node and before establishing a radio resource control (RRC) connection, an indication of support for demodulation reference signal (DMRS) bundling of a message of a random access (RA) procedure, wherein the one or more processors, to communicate the support for DMRS bundling of the message of the RA procedure, are configured, individually or in any combination, to:

receive a first indication of one or more of a first available DMRS port, a first DMRS sequence, or a first DMRS pattern associated with support for DMRS bundling;

receive a second indication of one or more of a second available DMRS port, a second DMRS sequence, or a second DMRS pattern associated with a lack of support for DMRS bundling;

transmit the message of the RA procedure using the first available DMRS port, the first DMRS sequence, or the first DMRS pattern to indicate support for DMRS bundling or using the second available DMRS port, the second DMRS sequence, or the second DMRS pattern to indicate a lack of support for DMRS bundling; and transmit, to the network node, the message of the RA procedure based at least in part on the support for DMRS bundling.

29. The UE of claim 28, wherein the one or more processors, to communicate the support for DMRS bundling of the message of the RA procedure, are configured, individually or in any combination, to transmit an additional message of the RA procedure, wherein one or more of an RA channel occasion, a preamble, or a DMRS pattern used in the message are associated with a capability of the UE to support DMRS bundling of a subsequent message of the RA procedure, wherein a first set of preambles are associated with a first duration of coherence for supporting DMRS bundling, wherein a second set of preambles are associated with a second duration of coherence for supporting DMRS bundling, wherein a third set of preambles are associated with not using DMRS bundling, wherein a first RA channel occasion is associated with the first duration of coherence for supporting DMRS bundling, wherein a second RA channel occasion is associated with the second duration of coherence for supporting DMRS bundling, wherein a third RA channel occasion is associated with not using DMRS bundling, or a combination thereof.

30. The UE of claim 28, wherein the one or more processors, to communicate the support for DMRS bundling of the message of the RA procedure, are configured, individually or in any combination, to transmit an additional message of the RA procedure, wherein one or more of an RA channel occasion, a preamble, or a DMRS pattern used in the message are associated with a capability of the UE to support DMRS bundling of a subsequent message of the RA procedure, wherein the one or more processors are further configured, individually or in any combination, to select the RA channel occasion, the preamble, or the DMRS pattern based at least in part on a supported duration of coherence for DMRS bundling.

* * * * *